United States Patent
Kako et al.

(10) Patent No.: US 6,753,793 B1
(45) Date of Patent: *Jun. 22, 2004

(54) KEY SWITCH DEVICE, KEYBOARD AND ELECTRONIC APPARATUS WITH KEY SWITCH

(75) Inventors: Mitsumasa Kako, Tokai (JP); Isao Mochizuki, Kaizu-gun (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/499,640

(22) Filed: Feb. 8, 2000

(30) Foreign Application Priority Data

Feb. 10, 1999 (JP) .............................. 11-032608
Sep. 28, 1999 (JP) .............................. 11-273722

(51) Int. Cl.⁷ .......................................... H03K 17/965
(52) U.S. Cl. .......................... 341/22; 200/5 R; 200/6 R
(58) Field of Search .......................... 341/22; 200/345, 200/5 R, 6 R, 4, 5 A; 362/29, 30

(56) References Cited

U.S. PATENT DOCUMENTS

| | | | | |
|---|---|---|---|---|
| 4,806,908 A | * | 2/1989 | Krupnik | 200/302.2 |
| 5,504,283 A | * | 4/1996 | Kako et al. | 200/344 |
| 5,562,203 A | * | 10/1996 | Mochizuki | 200/341 |
| 5,799,772 A | * | 9/1998 | Sanda et al. | 200/344 |
| 5,872,561 A | * | 2/1999 | Figie et al. | 341/22 |
| 6,068,416 A | * | 5/2000 | Kumamoto et al. | 200/344 |
| 6,288,457 B1 | * | 9/2001 | Kako et al. | 200/344 |

FOREIGN PATENT DOCUMENTS

| | | |
|---|---|---|
| EP | 0 543 649 A2 | 5/1993 |
| EP | 0 619 588 A1 | 10/1994 |
| EP | 0 696 038 A1 | 2/1996 |
| JP | U-2-5236 | 1/1990 |
| JP | U-5-16680 | 3/1993 |
| JP | U-6-77133 | 10/1994 |

* cited by examiner

Primary Examiner—Michael Horabik
Assistant Examiner—Hung Dang
(74) Attorney, Agent, or Firm—Oliff & Berridge, PLC

(57) ABSTRACT

In a key switch device 3, a guide member 10 constructed of a first and a second links 14 and 15, which guides a vertical movement of a key top 9, is movably mounted on a rigid circuit board 60 with a metal supporting member 64 provided with a slidably supporting portion 64A which slidably supports a slidable shaft 20 formed at a lower end of the second link 15 and a metal supporting member 65 provided with a rotatably supporting portion 65A which rotatably supports a rotatable shaft 18 formed at a lower end of the first link 14. The supporting members 64, 65 are fixed on copper foil land patterns 62, 63, respectively, by soldering.

20 Claims, 17 Drawing Sheets

KEY SWITCH DEVICE, KEYBOARD AND ELECTRONIC APPARATUS WITH KEY SWITCH

BACKGROUND OF THE INVENTION

1. Field of the Invention

The present invention relates to a key switch device having a guide member provided with two link members mutually movably connected, the guide member guiding a vertical movement of a key top to thereby effect a switching operation. In particular, the present invention relates to a key switch device having a circuit board with a circuit pattern for performing a switching operation by the circuit pattern, the circuit board being disposed below a key top, and a mounting member for movably supporting each lower end of two link members of a guide member, the mounting members being fixed on the circuit board by a predetermined fixing manner, thereby the key switch device can reduce manufacturing cost and increase design flexibility of a keyboard provided with a plurality of the key switch devices, and achieve weight reduction of the keyboard.

Further, the present invention relates to a keyboard and an electronic apparatus in which the above key switch devices are arranged.

2. Description of Related Art

Conventionally, there have been proposed key switch devices each having a guide member constructed of a pair of link members mutually movably connected in an intersecting state, and the guide member serves to guide the vertical movement of a key top to effect a switching operation in association with the vertical movement of the key top. For example, such a key switch is disclosed in Japanese utility model application laid-open No. Hei 2-5236. This key switch is provided with a key top, an upper holder attached to an underside of the key top, a first lower holder and a second lower holder attached to a printed substrate, and two rectangular frames connected to each other in an X-shaped configuration as viewed in side elevation, which are disposed between the key top and the printed substrate.

In this key switch, an upper portion of one of the rectangular frames is slidably supported in the upper holder between the lower surface of the key top and the upper holder, while leg portions of the rectangular frame are rotatably supported in the first lower holder. On the other hand, an upper portion of the other rectangular frame is rotatably supported in a groove of the upper holder, while leg portions of the rectangular frame are slidably supported in the second lower holder. Furthermore, a rubber switch is disposed on the printed substrate, and a convex portion of the key top, projecting downward, is engaged with the rubber switch. The rubber switch is provided with a movable contact disposed corresponding to a fixed contact disposed on the printed substrate.

The above key switch is configured such that the key top is vertically moved with its horizontal position being maintained, no matter which portion of the key top is depressed by an operator. Accordingly, the movable contact of the rubber switch engaged with the key top is made into contact with the fixed contact of the printed substrate whenever the rubber switch is pushed upon depression of the key top, thus effecting a switching operation.

However, in the above key switch disclosed in Japanese utility model application laid-open publication No. Hei 2-5236, the first and second lower holders attached to the printed substrate are all inserted in mounting holes formed in the printed substrate (see FIGS. 2 and 4 in the publication) and fixed therein. Therefore, each lower end of the first and second lower holders is made projecting downward from a lower surface of the printed substrate.

Such projecting lower ends of the first and second lower holders may cause a difficulty in thickness reduction of the key switch and be against actual circumstances that the reduction of the thickness of a key switch is promoted.

To conform the need of reduction in size and thickness of a keyboard with a sufficient key stroke being ensured, applicant of the present invention proposed a key switch device which is disclosed in U.S. Pat. No. 5,504,283, in which an electrical circuit pattern is formed on an insulating layer provided on a metal substrate, and four mounting portions are formed integrally with the substrate by pressing and disposed surrounding a fixed contact pattern in the circuit pattern. Two of the four mounting portions having arc shapes are used as rotatably supporting portions, and the other two having long-hole shapes are used as slidably supporting portions.

In the above switch device, a guide supporting member constructed of two link members which are mutually rotatably connected is disposed between the key top and the substrate. A support shaft formed between upper ends of the two link members is rotatably supported in the connecting portions formed on the underside of the key top and support pins formed at lower ends of the link member are slidably supported in the slidably supporting portions of the substrate support pins formed at upper ends of the other link member is slidably supported in the connecting portions formed on the underside of the key top and a support shaft formed between lower ends of the link member is rotatably supported in the rotatably supporting portions of the substrate.

In the key switch disclosed in the U.S. Pat. No. 5,504,283, the metal substrate is formed integrally with the mounting portions (supporting portions) by pressing, the mounting portions serving to slidably or rotatably support the support pins or Shafts disposed on the lower parts of the link members. Thus, this realizes a key switch device which can ensure a sufficient key stroke and reduce the size of the keyboard, especially the thickness thereof.

However, a predetermined pressing work to integrally form the mounting portions with the substrate needs a relatively large pressing die in order to form the mounting portions in the whole area of the substrate. Since the pressing die is expensive, the cost of the key switch device is increased in association therewith.

Furthermore, specifications such as the placement manner of key switches are generally determined in various countries where the key switches are used. If the key switch device is manufactured based on each of the specifications in the countries where the key switch device is to be used, plural types of a pressing die must be prepared to perform a suitable pressing work on a substrate in response to the respective specifications. Accordingly, the preparation of plural pressing dies, each being inherently expensive in cost, may cause the increase in cost of the key switch device.

Furthermore, the metal substrate itself used in the above key switch device is considerably heavy, so that the whole key switch device increases in weight. This obstructs weight reduction of the key switch device.

SUMMARY OF THE INVENTION

The present invention has been made in view of the above circumstances and has an object to overcome the above problems and to provide a key switch device having mounting members for movably supporting lower ends of two link members of a guide member guiding vertical movement of a key top, the mounting members being fixed on a film sheet for performing a switching operation, by a predetermined one of various fixing manners, thus eliminating the need of a pressing die used in the prior art, so that the key switch device can reduce the manufacturing Cost, increase the design flexibility of a keyboard provided with a plurality of the key switch devices, and achieve weight reduction of the keyboard.

To achieve the purpose of the invention, according to one aspect of the present invention, there is provided a key switch device including a key top;

a circuit board disposed below the key top, the circuit board having a switching circuit formed thereon;

a guide member provided with a first link and a second link which are mutually movably connected;

a switching member which performs a switching operation with the switching circuit on the circuit board in association with a vertical movement of the key top;

a first shaft formed at a lower end of the first link;

a second shaft formed at a lower end of the second link; and a mounting member for movably supporting both the first and second shafts, the mounting member being fixed on an upper surface of the circuit board.

In the above key switch device according to the present invention, a circuit board having a switching circuit is used. On the circuit board, a mounting member made is fixed to the circuit board so that the first shaft of the first link and the second shaft of the second link of the guide member are movably supported. It is therefore unnecessary to form supporting portions in the support plate by a press working. Accordingly, the need of a pressing die used in the press working is eliminated, and the manufacture cost of the key switch device can be reduced.

Even if the specifications of the keyboard provided with the key switch devices are different on a country-to-country basis, it is sufficient to form a fixing area constructed from a metal land patterns in response to the specifications and to fix the mounting members on the land patterns. This can increase the design flexibility of the keyboard having the key switch devices without preparation of a pressing die for the different specifications on a country-to-country basis.

The mounting member of the key switch device may be fixed to the metal land pattern on the circuit board by soldering. The use of circuit board may not necessarily require a support plate, which will enable the weight reduction of the key switch device.

The circuit board is preferably a rigid circuit board. The board having the great rigidity can support the entire keyboard provided with a plurality of the key switch devices, so that the support plate may be eliminated.

According to another aspect of the present invention, there is provided a key switch device including;

a key top;

a transparent membrane switch member disposed below the key top;

a guide member provided with a first link and a second link which are mutually movably connected;

a switching member which performs a switching operation of the membrane switch member in association with a vertical movement of the key top;

a first shaft formed at a lower end of the first link;

a second shaft formed at a lower end of the second link;

a mounting member for movably supporting both the first and second shafts, the mounting member being fixed on an upper surface of the membrane switch member; and an electro-luminescent sheet disposed below the membrane switch member, the electro-luminescent sheet backlighting the key top when a predetermined voltage is applied to the electro-luminescent sheet.

In the above key switch device according to the present invention, the mounting member is fixed on the upper surface of the membrane switch member and movably supports the first and second shafts formed at the lower ends of the first and second links respectively of the guide member for guiding the vertical movement of the key top. And the electro-luminescent sheet, which backlights the key switch when a predetermined voltage is applied thereto, is disposed below the membrane switch sheet. Accordingly, similarly to the above key switch device, the support plate has no need to be integrally formed with supporting portions for mounting the guide member by a press working and the like. This eliminates the necessity of an expensive pressing die, thus enabling the reduction of manufacturing cost of the key switch device.

Even if the specifications such as the placement of the key switch devices in a keyboard are different according to countries where the key switch device is to be used, it is sufficient to fix the mounting members on the membrane switch member in agreement with the specifications on a country-to-country basis. This can increase the design flexibility of a keyboard having the key switch devices without preparation of a pressing die for the specifications in each country.

Since the mounting member is fixed on the upper surface of the membrane switch member, a support plate may be eliminated, which achieves the weight reduction of the key switch device.

Further, in addition to the above effects, since the electro-luminescent sheet is disposed below the membrane switch member and backlights the key top when a predetermined voltage is applied thereto, the key switches arranged on the keyboard can be easily identified, even in darkness or low ambient light conditions, so that key operation can be easily performed in such conditions. And in case that the key switches are used in a projector, which is usually used in darkness or low ambient light conditions, the key switches will ensure the proper and smooth projector operations with the electro-luminescent sheet backlighting the key tops in the key switches.

According to further another aspect of the present invention, there is provided a keyboard provided with a key switch device including;

a key top;

a circuit board disposed below the key top, the circuit board having a switching circuit formed thereon;

a guide member provided with a first link and a second link which are mutually movably connected;

a switching member which performs a switching operation with the switching circuit on the circuit board in association with a vertical movement of the key top;

a first shaft formed at a lower end of the first link;

a second shaft formed at a lower end of the second link; and a mounting member for movably supporting both the first and second shafts, the mounting member being fixed on an upper surface of the circuit board.

And according to further another aspect of the present invention, there is provided with an electronic apparatus having a keyboard provided with a key switch including:

a key top;

a circuit board disposed below the key top, the circuit board having a switching circuit formed thereon;

a guide member provided with a first link and a second link which are mutually movably connected;

a switching member which performs a switching operation with the switching circuit on the circuit board in association with a vertical movement of the key top;

a first shaft formed at a lower end of the first link;

a second shaft formed at a lower end of the second link; and a mounting member for movably supporting both the first and second shafts, the mounting member being fixed on an upper surface of the circuit board.

The above key switch devices utilized in the keyboard and the keyboard used in the electronic apparatus have the same feature as that of the key switch device described above. Therefore, the same effects described with reference to the above key switch device can be obtained.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENT

A detailed description of preferred embodiments of a key switch device embodying the present invention will now be given referring to the accompanying drawings.

Figure 20:
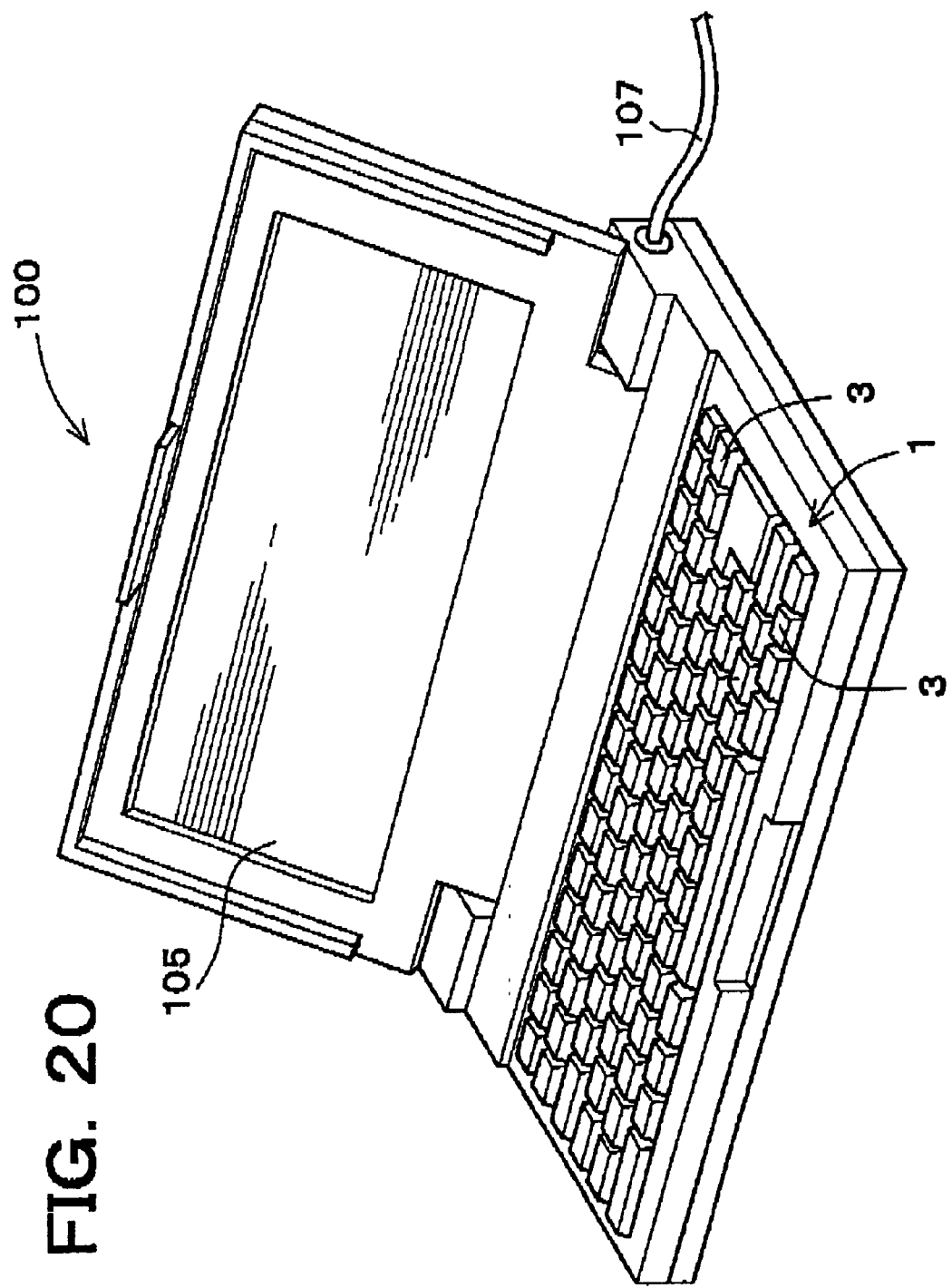
FIG. 20 is a schematic perspective view of a notebook-size personal computer.

First, a notebook-size personal computer on which a key switch device according to the preferred embodiments of the invention is mounted, is briefly explained with reference to FIG. 20. FIG. 20 is a schematic perspective view of a notebook-size personal computer.

As shown in FIG. 20, a notebook-size personal computer 100 is mainly provided with a keyboard 1 having a plurality of key switch devices 3, a liquid crystal display 105 which visually displays such to as calculation results obtained in a central processing unit (CPU; not shown), and a power cord 107 through which electric power is supplied to the computer 100. It is to be noted that the internal structure of the computer 100 has been known and the detail explanation thereof is omitted.

Figure 1:
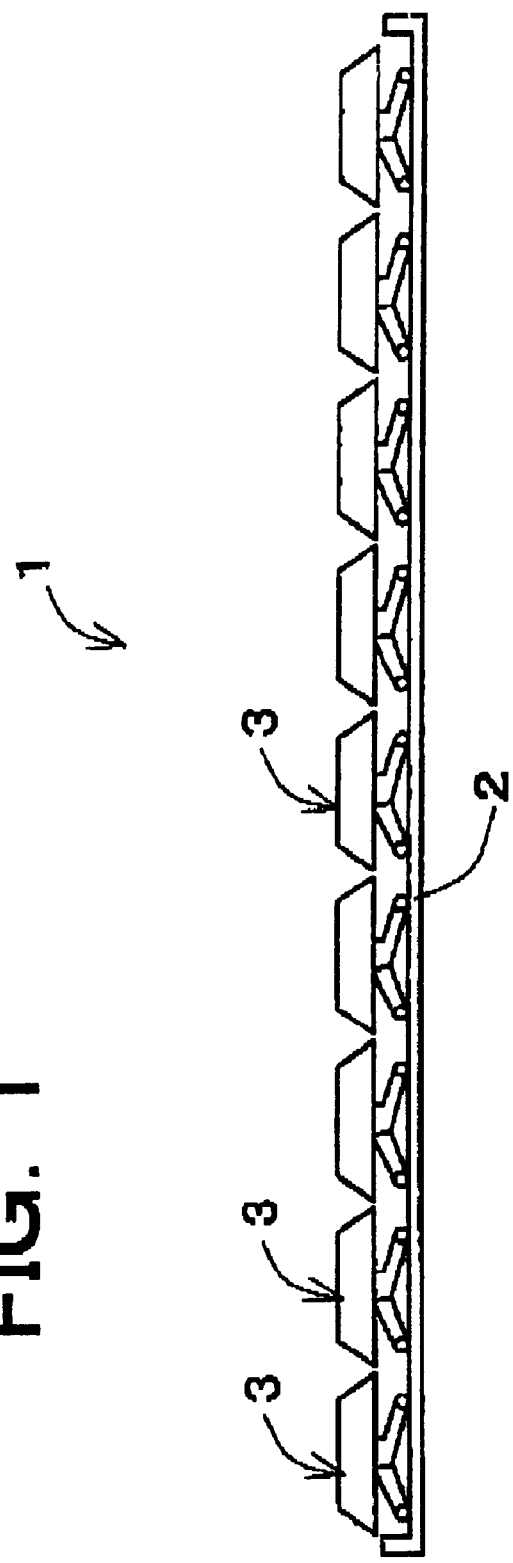
FIG. 1 is a schematic side view of a keyboard in a first preferred embodiment according to the present invention.

The structure of the keyboard having a plurality of key switch devices in a first embodiment will be described below with reference to FIGS. 1 and 2. FIG. 1 is a schematic side view of a keyboard.

Figure 2:
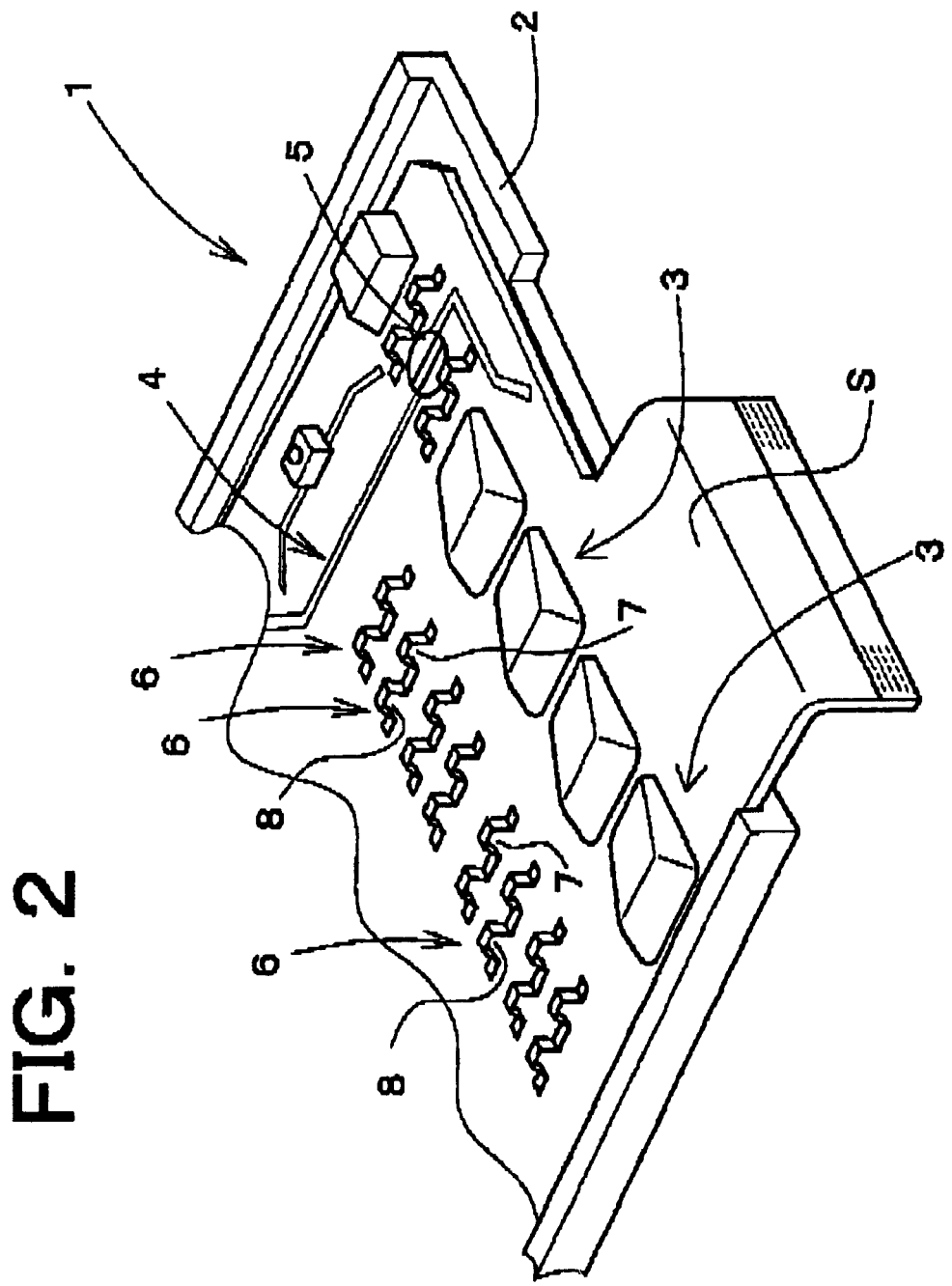
FIG. 2 is a schematic perspective partial view of the keyboard, where some of key tops of key switch devices are omitted.

FIG. 2 is a schematic perspective view of a part of the keyboard, in which some of key tops of the key switch devices are omitted.

In FIGS. 1 and 2, the keyboard 1 is provided with a support plate 2 which is disposed between an upper and lower cases of a notebook-size personal computer and the like and a film sheet S made of polyethylene terephthalate (PET) disposed on the support plate 2 (or an upper surface of the lower case), and a plurality of the key switch devices 3 arranged in the longitudinal and transverse directions of the plate 2. A predetermined circuit pattern 4 is formed on the upper surface of the PET film sheet S with use of a conductive ink and the like. A fixed contact pattern 5 is formed at a substantially center in each of the areas where the key switch devices 3 are disposed one-by-one on the circuit pattern 4.

In each of the areas associated with the key switch devices 3, a pair of mounting members 6 are fixed in parallel at a predetermined distance therebetween on the PET film sheet S with an adhesive. The paired mounting members 6 are identical in structure and one is explained below. The mounting member 6 is made in such a manner that linear metal such as aluminum or iron is worked into a predetermined shape and cut into a chip having the unit length of one key switch device 3. The thus formed mounting member 6 has a rotatably supporting portion 7 and a slidably supporting portion 8, as will be mentioned later. The rotatably supporting portion 7 has a recess and is so configured as to rotatably engage with a rotatable shaft 18 formed at a lower end of a first link 14 constructing a guide member 10 which guides the vertical movement of a key top 9. The slidably supporting portion 8 has an elongated recess and is so configured as to slidably engage with a slidable shaft 20 formed at a lower end of a second link 15.

As an adhesive for fixing the mounting member 6 to the PET film sheet S, a commercially available adhesive which is usable for high-density packaging of various chip components is used. For instance, preferably used is an epoxy adhesive that is hardened in a short time and is excellent in heat-resistance to soldering, in electrical and mechanical properties, and in insulating properties. The mounting member 6 may be directly fixed on the PET film sheet S. Alternatively, it may be configured such that the PET film sheet S is first subjected to a pre-treatment to facilitate the adhesion of the adhesive to the sheet, an adhesive layer (for example, of UV ink and the like) suitable for the PET film sheet S is then formed thereon, and the adhesive is further applied onto the adhesive layer, so that the mounting member 6 is adhered on the adhesive layer with the adhesive.

Figure 3A:
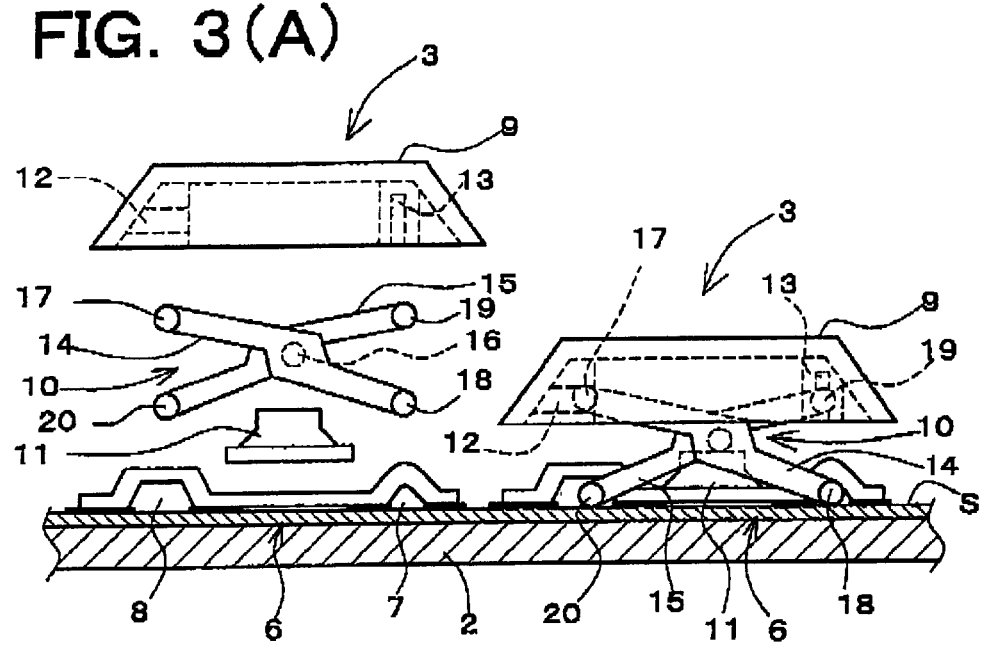
FIG. 3A is a schematic side view of the key switch devices in the first embodiment, one of which is shown in an exploded state.

Next, the structure of the key switch device 3 is described with reference to FIG. 3A which is a schematic side view of the key switch devices, a left one of which is shown in an exploded state. The key switch device 3 is mainly constructed of a key top 9, a guide member 10 for vertically movably supporting the key top 9, a rubber spring 11 disposed under the guide member 10 and over the fixed contact pattern 5 of the circuit pattern 4 formed on the PET film sheet, and the pair of mounting members 6.

The key top 9 is formed of a synthetic resin, such as an ABS resin. A predetermined character, symbol, and the like is provided on the upper surface of the key top 9 by printing or the like. The underside of the key top 9 is integrally provided with connecting portions 12 and 13. The connecting portion 12 is positioned above the slidably supporting portion 8 of the mounting member 6 and the connecting portion 13 is positioned above the rotatably supporting portion 7, as viewed in FIG. 3. These connecting portions 12 and 13 may be constructed of components separately configured from the key top 9 and attached to the underside of the key top 9.

The guide member 10 is constructed of a first link 14 and a second link 15 which are intersected and mutually rotatably connected together at a fulcrum portion 16. The first link 14 is provided with a slidable shaft 17 projecting outward (i.e., vertically to the drawing sheet) at an upper end of the first link 14. This shaft 17 is horizontally slidably supported in the connecting portion 12 of the key top 9. The first link 14 is also provided with a rotatable shaft 18 projecting outward (i.e., vertically to the drawing sheet) at a lower end of the first link 14. This shaft 18 is rotatably supported in the rotatably supporting portion 7 of the mounting member 6.

The second link 15 is provided with a rotatable shaft 19 projecting outward at an upper end of the second link 15. This shaft 19 is rotatably supported in the connecting portion 13 of the key top 9. The second link 15 is also provided with a slidable shaft 20 projecting outward at a lower end of the second link 15. This shaft 20 is horizontally slidably supported in the slidably supporting portion 8 of the mounting member 6. The structures of the first and second links 14 and 15 constituting the guide member 10 are substantially the same as those of the link members disclosed in the U.S. Pat. No. 5,504,283. Accordingly, the detail description of the structures is referred thereto and omitted in the present specification.

The rubber spring 11 is formed into an inverted cup-shape and of a rubber material, such as silicon or EPDM, which includes a movable contact (not shown) disposed on the internal upper wall of the rubber spring 11. This movable contact is opposed to the fixed contact pattern 5 of the circuit pattern 4 on the PET film sheet S. Above the rubber spring 11, the fulcrum portion 16 of the guide member 10 is positioned.

Figure 4A:
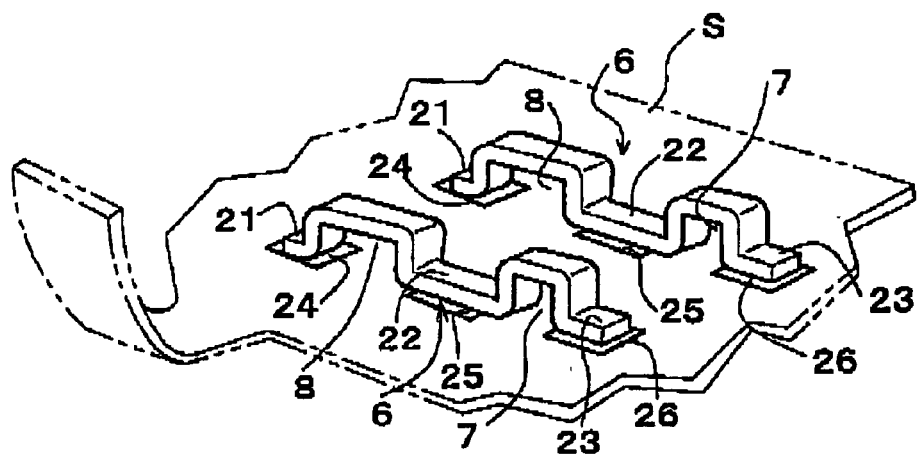
FIG. 4A is a perspective view of mounting members fixed on a PET film sheet in the key switch device.

As shown in FIG. 4A, the mounting member 6 in the first embodiment is provided with the slidably supporting portion 8 permitting sliding of the slidable shaft 20 of the second link 15, the rotatably supporting portion 7 permitting rotating of the rotatable shaft 18 of the first link 14, a first adhering portion 21 continuously extending from the slidably supporting portion 8 to the left in FIG. 4A, a second adhering portion 22 connecting the supporting portions 7 and 8, and a third adhering portion 23 continuously extending from the supporting portion 7 to the right in FIG. 4A. The first, second, and third adhering portions 21, 22, and 23 of the mounting member 6 are adhered to the PET film sheet through a first, second, and third adhesive layers 24, 25, and 26, respectively, applied on the PET film sheets. Thus, the mounting member 6 is adhered to and fixed on the PET film sheet S.

Figure 4B:
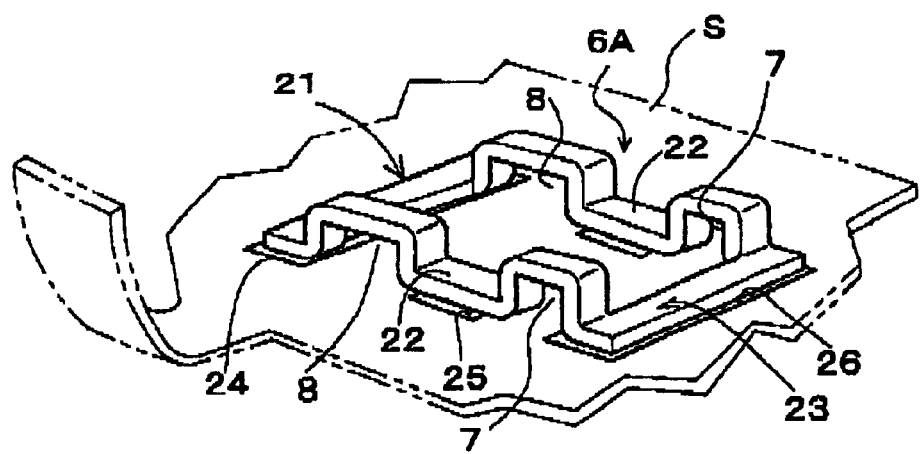
FIG. 4B is a perspective view of a modification of the mounting member fixed on the PET film sheet.

The mounting member 6 may be modified as viewed in FIG. 4B. In FIG. 4B, a mounting member 6A integrally have the first adhering portion 21 outwardly connecting the slidably supporting portions 8 of two mounting members 6 and the third adhering portion 23 outwardly connecting the rotatably supporting portions 7 of two 20 mounting members 6. The thus formed mounting member 6A may be alternatively used. For the use of the mounting member 6A, the first and third adhesive layers 24 and 26 need to be applied on the PET film sheet S in correspondence to the lengths of the relatively long first and third adhering portions 21 and 23, as shown in FIG. 43. As compared with a pair of mounting members 6 separately formed as shown in FIG. 4A, the integrally formed mounting member 6A prevents the positional deviation between two mounting members 6 from occurring and maintains a certain positional relationship therebetween, so that a high-precision key switch device can be achieved. Further, the stiffness of the entire mounting member 6A is improved by connecting two mounting member 6 through the first and third adhering portions 21 and 23, which can increase the durability of the key switch device.

Figure 5:
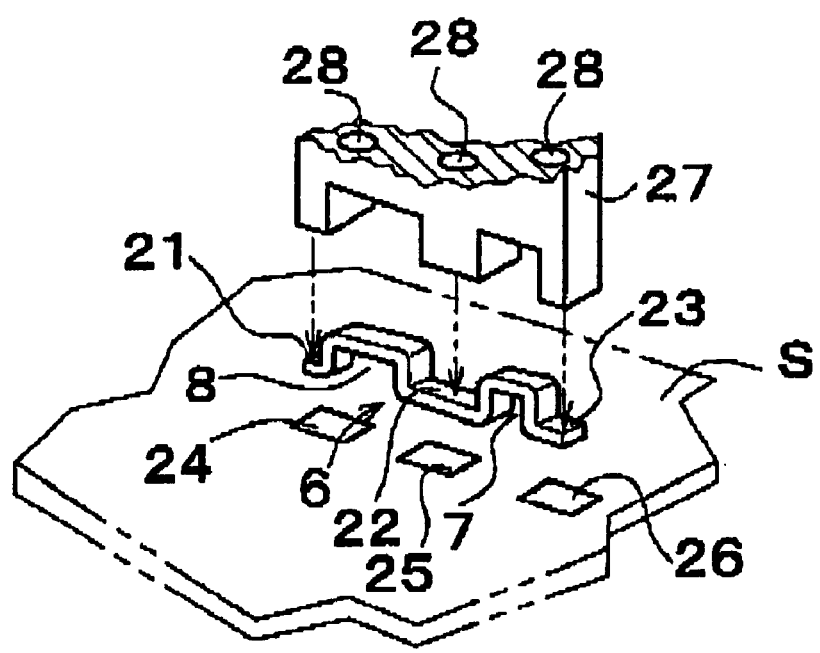
FIG. 5 is a schematic perspective view of the mounting member when fixed on the PET film sheet with use of a suction head.

The mounting member 6 having the above configuration is produced by continuously drawing a part of a flat linear material from a roll thereof and molding it into a predetermined shape, and cutting it by the unit length of the key switch device 3. Alternatively, the mounting member 6 may be made of resin by molding. The mounting member 6 produced as above is fixed on the PET film sheet S in the following manner; the PET film sheet S which has been formed into a predetermined shape is first set in a predetermined position; then, the first, second, and third adhesive layers 24, 25, and 26 are applied the PET film sheet S in each position corresponding to the key switch device 3 by a known automatic adhesive applying device. With an automatic mounting device loading the mounting member 6 chipped as above, as shown in FIG. 5, the mounting member 6 stuck to a suction head 27 under suction through suction holes 28 is placed on the PET film sheet S such that the first, second, and third adhering portions 21, 22, and 23 correspond to the first, second, and third adhesive layers 24, 25, and 26, respectively, and then the mounting member 6 is pressed onto the PET film sheet S by the suction head 27 at a predetermined pressure. The mounting member 6 is thus adhered to and fixed on the PET film sheet S in a predetermined position through the first through third adhesive layers 24, 25, and 26. The underside of the suction head 27 has a shape corresponding to the shape of the mounting member 6 as shown in FIG. 5 so that the head 27 can securely press the mounting member 6 to the first, second, and third adhesive layers 24–26 respectively.

The operation of the key switch device 3 having the above construction is explained below.

When the key top 9 is depressed, the slidable shaft 17 of the first link 14 is slid horizontally (leftward in FIG. 3A) in the connecting portion 12 of the key top 9 and, simultaneously, the rotatable shaft 18 is rotated counterclockwise in the supporting portion 7 of the mounting member 6. At the same time, the rotatable shaft 19 of the second link 15 is rotated clockwise in the connecting portion 13 of the key top 9 and, simultaneously, the slidable shaft 20 is slid horizontally (leftward in FIG. 3A) in the supporting portion 8 of the mounting member 6. The fulcrum portion 16 connecting the first and second link 14 and 15 is accordingly lowered to gradually depress the rubber spring 11. When the amount of depression of the rubber spring 11 exceeds a certain limit, the rubber spring 11 is buckled. As a result, the movable contact provided on the internal upper wall of the rubber spring 11 is made into contact with the fixed contact pattern 5 of the Circuit pattern 4, thus effecting a switching operation.

When the depression force applied to the key top 9 is removed, the fulcrum portion 16 of the first and second links 14 and 15 is lifted by an elastic restoring force of the rubber spring 11. In association therewith, the shafts 17 and 18 of the first link 14 and the shafts 19 and 20 of the second link 15 are operated reversely to the above, and thus the key top 9 is returned to the original position shown in FIG. 3A.

Figure 3B:
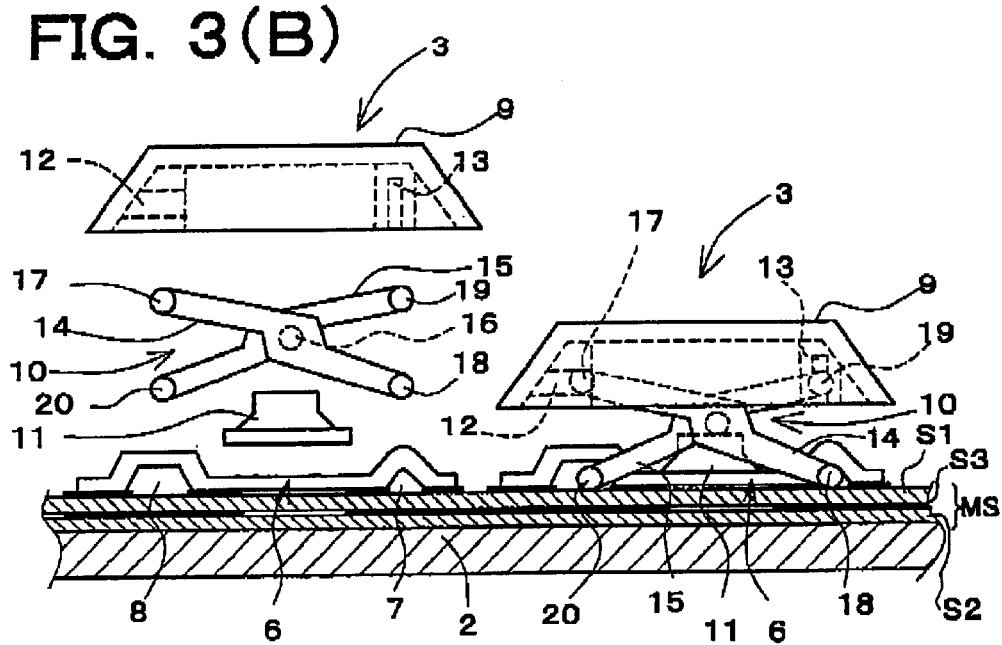
FIG. 3B is a schematic side view of a modification of the key switch devices in the first embodiment, one of which is shown in an exploded state.

The key switch device 3 in the first preferred embodiment of the invention is constructed such that the mounting member 6 is fixed on a single sheet of PET film S disposed on the support plate 2, through an adhesive, but it may be modified as viewed in FIG. 3B.

FIG. 3B is a schematic side view of a modification of the key switch 3 in the first embodiment. In FIG. 3B, a membrane switch sheet MS having a three-layer configuration is disposed on the support plate 2. This membrane switch sheet MS is constructed of an upper PET film sheet S1, a lower PET film sheet S2, and a spacer sheet S3 disposed between the upper and lower sheets S1 and S2. The lower PET film sheet 52, having the same structure as that of the PET film sheet S in the first embodiment, is provided with a circuit pattern 4 and a fixed contact pattern 5 on the upper surface of the sheet 52. The upper PET film sheet S1 is provided with a movable contact pattern (not shown) disposed in a position opposite to the fixed contact pattern 5. The spacer sheet S3 serves to separate the upper and lower sheets S1 and 52 and is provided with a switching hole at a position where the fixed contact pattern 5 of the lower sheet S2 is opposite to the movable contact pattern of the sheet S1.

On the upper surface of the upper PET film sheet S1 of the membrane switch sheet MS constructed as above, the mounting member 6 is fixed in the above mentioned manner as shown in FIG. 3B.

It is to be noted that the switching operation of the key switch device 3 is effected by contact and separation between the movable contact pattern of the upper sheet S1 and the fixed contact circuit 5 of the lower sheet S2. Accordingly, no movable contact is provided on the internal upper wall of the rubber spring 11 disposed on the upper PET film sheet S1.

When the key top 9 of the key switch device 3 (shown in FIG. 3B) in the modification of the first embodiment is depressed, the slidable shaft 17 of the first link 14 is slid horizontally (leftward in FIG. 3B) in the connecting portion 12 of the key top 9 and, simultaneously, the rotatable shaft 18 is rotated counterclockwise in the rotatably supporting portion 7 of the mounting member 6. At the same times the rotatable shaft 19 of the second link 15 is rotated clockwise in the connecting portion 13 of the key top 9 and, simultaneously, the slidable shaft 20 is slid horizontally (leftward in FIG. 3B) in the supporting portion 8 of the mounting member 6. The fulcrum portion 16 connecting the first and second links 14 and 15 is accordingly lowered to gradually depress the rubber spring 11. When the amount of depression of the rubber spring 11 exceeds a certain limits the rubber spring 11 is buckled. As a result, the internal upper wall of the rubber spring 11 depresses the upper PET film sheet S1 from above and causes the movable contact pattern provided on the underside of the sheet S1 to come into contact with the fixed contact pattern 5 formed on the upper surface of the sheet S2, thus effecting a predetermined switching operation.

When the depression force applied to the key top 9 is removed, on the other hand, the fulcrum portion 16 of the first and second links 14 and 15 is lifted by an elastic restoring force of the rubber spring 11. In association therewith, the shafts 17, 18 of the first link 14 and the shafts 19, 20 of the second link 15 are operated reversely to the above, and thus the key top 9 is returned to the original position shown in FIG. 3B.

Figure 6A:
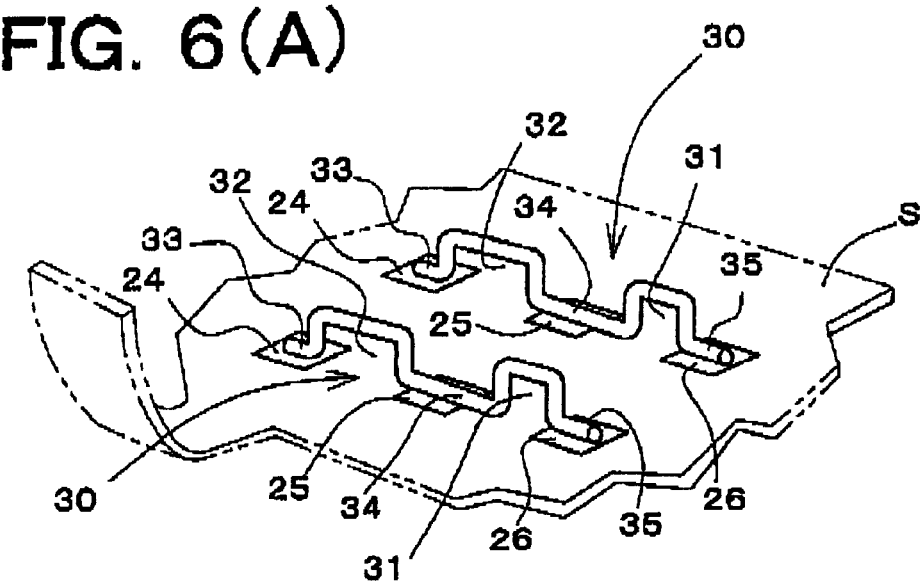
FIG. 6A is a perspective view of the mounting members fixed on the PET film sheet in the key switch device in a second preferred embodiment according to the present invention.

Next, a key switch device in a second preferred embodiment according to the present invention will now be described with reference to FIG. 6A. The key switch device in this embodiment has substantially the same structure as in the first embodiment, except that the mounting member 6 in the second embodiment is made of a needle-like linear material, which is different from the mounting member 6 in the first embodiment made of a flat linear material. Accordingly, parts identical to those of the first embodiment are indicated at the same reference numerals. The following description is focused on the feature of the key switch device in the second embodiment. FIG. 6A is a schematic perspective view of the mounting members fixed on the PET film sheet S in the key switch device in the second preferred embodiment.

In FIG. 6A, a mounting member 30 is provided with a slidably supporting portion 32 which slidably supports the slidable shaft 20 formed at the lower end of the second link 15, a rotatably supporting portion 31 which rotatably supports the rotatable shaft 18 formed at the lower end of the first link 14 of the guide member 10, a first adhering portion 33 continuously extending from the supporting portion 32 to the left in FIG. 6A, a second adhering portion 34 connecting the supporting portions 31 and 32, and a third adhering portion 35 continuously extending from the supporting portion 31 to the right in FIG. 6A. The first, second, and third adhering portions 33, 34, and 35 of the mounting member 30 are adhered to the PET film sheet S through a first, second, and third adhesive layers 24, 25, and 26, respectively, applied on the PET film sheet S. Thus, the mounting member 30 is adhered to and fixed on the PET film sheet S.

Figure 6B:
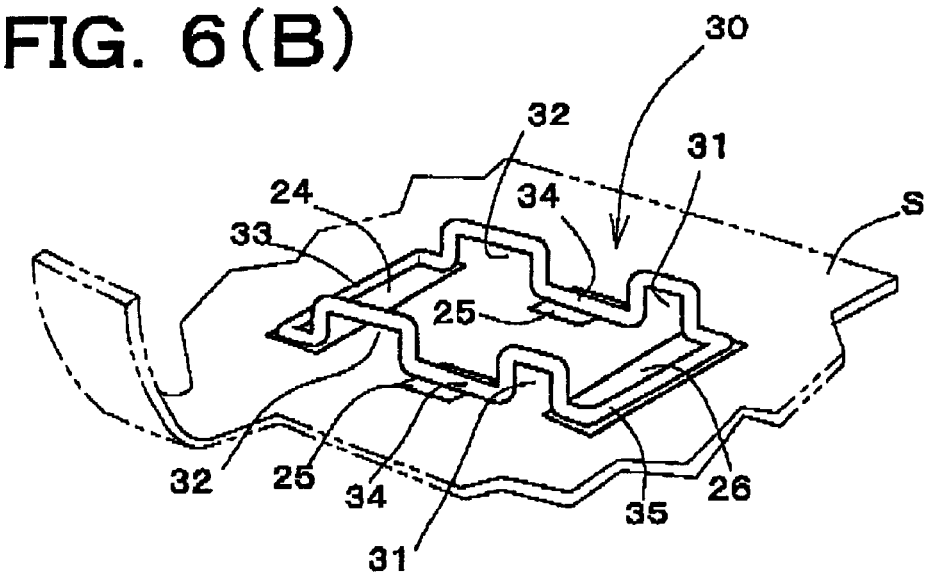
FIG. 6B is a perspective view of a modification of the mounting members fixed on the PET film sheet in the key switch device in the second embodiment.

The mounting member 30 may be modified as viewed in FIG. 6B. In FIG. 6B, a mounting member 30A integrally have the third adhering portion 35 outwardly connecting the rotatably supporting portions 31 of two mounting members 30. The thus formed mounting member 30A may be alternatively used. For the use of the mounting member 30A, the third adhesive layer 26 needs to be applied to the PET film sheet S in correspondence to the length of the relatively long third adhering portion 35 as shown in FIG. 6B. As compared with a pair of mounting members 30 separately formed as shown in FIG. 6A, the integrally formed mounting member 30A prevents the positional deviation between two mounting members 30 from occurring and maintains a certain positional relationship therebetween, so that a high-precision key switch device can be achieved. Further, the stiffness of the entire mounting member 30A is improved by connecting two mounting member 30 through the third adhering portion 35, which can increase the durability of the key switch device.

The mounting member 30 having the above configuration is produced by continuously drawing a part of a needle-like linear material from a roll thereof and molding it into a predetermined shape, and cutting it by the unit length of the key switch device 3. The thus produced mounting member 30 is fixed on the PET film sheet S in the following manner; the PET film sheet S which has been formed into a predetermined shape is first set in a predetermined position; then, the first, second, and third adhesive layers 24, 25, and 26 are applied to the PET film sheet S in respective positions within the area corresponding to the key switch device 3 by a known automatic adhesive applying device. With an automatic mounting device loading the mounting member 30 chipped as above, as shown in FIG. 5, the mounting member 30 stuck to a mounting head (not shown) under suction is placed such that the first, second, and third adhering portions 33, 34, and 35 correspond to the first, second, and third adhesive layers 24, 25, and 26, respectively, and then the mounting member 30 is pressed onto the PET film sheet S by the mounting head at a predetermined pressure. The mounting member 30 is thus adhered and fixed on the PET film sheet S in a predetermined position through the first through third adhesive layers 24, 25, and 26.

Figure 7:
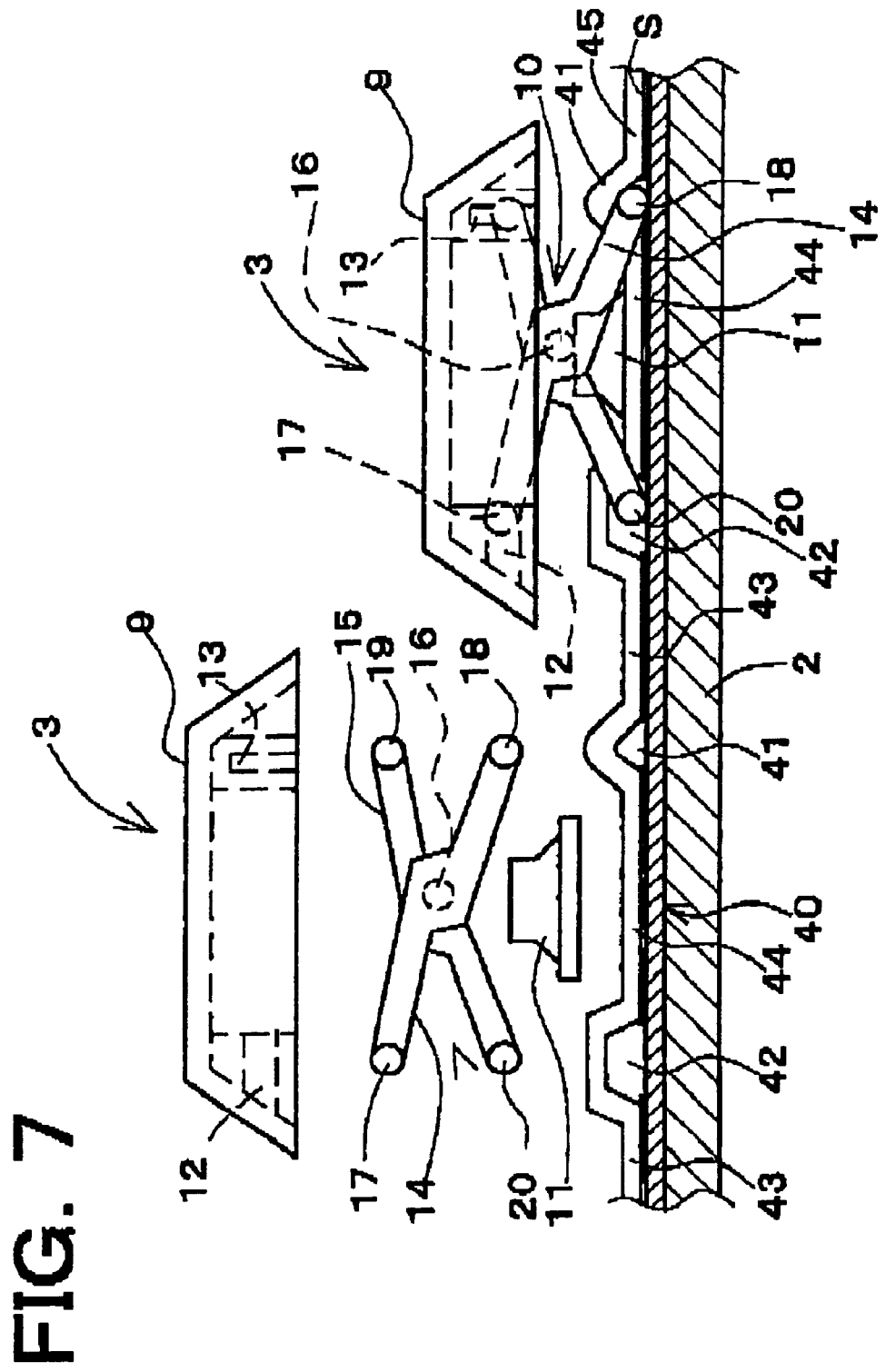
FIG. 7 is a schematic side view of the key switch devices in a third preferred embodiment according to the present invention, one of which is shown in an exploded state.

Next, a key switch device in a third preferred embodiment according to the present invention will be described with reference to FIG. 7. The key switch device in this embodiment has substantially the same structure as in the first and second embodiments, except that the mounting member in the third embodiment is formed having a length corresponding to a plurality of key switch devices aligned in a row on the PET film sheet S in the longitudinal and transverse directions respectively, while the mounting members 6 and 30 in the first and second embodiments are chipped in correspondence to the unit length of the key switch device 3. Accordingly, parts identical to those of the first and second embodiments are indicated at the same reference numerals. The following description is focused on the feature of the key switch device in the third embodiment. FIG. 7 is a schematic perspective side view of the key switch devices in the third embodiment.

In FIG. 7, the key switch device 3 is mainly constructed of, like in the above mentioned embodiments, a key top 9, a guide member 10 for supporting the key top 9 so as to permit the vertical movement of the key top 9, a rubber spring 11 disposed under the guide member 10 and over a fixed contact pattern 5 of a circuit pattern 4 formed on a PET film sheet S, and a pair of mounting members 40.

The mounting member 40 is formed with a length covering a plurality of key switch devices 3 as shown in FIG. 7. The mounting member 40 has, in each of the portions which are in one-to-one correspondence with the key switch devices 3, a rotatably supporting portion 41 for rotatably supporting a rotatable shaft 18 of a first link 14 and a slidably supporting portion 42 for slidably supporting a slidable shaft 20 of a second link 15. In such the long mounting member 40 as shown in FIG. 7, for example, the part existing between the slidably supporting portion 42 associated with the right key switch device 3 and the rotatably supporting portion 41 associated with the left key switch device 3 is a first adhering portion 43, and the part existing between the supporting portions 41 and 42 for one key switch device 3 is a second adhering portion 44. The part formed continuing from the supporting portion 41 associated with the key switch device 3 positioned in one end of the mounting member 40 (for example, in a right end in FIG. 7) is a third adhering portion 45. It is to be noted that the number of key switch devices 3 associated with the mounting member 40 can optionally be determined according to various specifications for the keyboard 1.

The first, second, and third adhering portions 43, 44, and 45 of the mounting member 40 are adhered and fixed on the PET film sheet S through the first, second, and third adhesive layers 24, 25, and 26 (see FIGS. 4A and 6A), respectively. The mounting member 40 is thus adhered and fixed on the PET film sheet S.

The mounting member 40 is produced by continuously drawing a part of a flat linear material from a roll thereof and molding it into a predetermined shape, and cutting it by the length corresponding to a plurality of the key switch devices 3. The thus produced mounting member 40 is fixed on the PET film sheet S in the following manner, like in the above embodiments; the PET film sheet S which has been formed into a predetermined shape is first set in a predetermined position; then, the first, second, and third adhesive layers 24, 25, and 26 are applied to the PET film sheet S in respective positions within the area corresponding to the key switch device 3 by a known automatic adhesive applying device. With an automatic mounting device loading the long mounting member 40, the mounting member 40 being held in the mounting device is placed such that the first, second, and third adhering portions 43, 44, and 45 correspond to the first, second, and third adhesive layers 24, 25, and 26, respectively, and then the mounting member 40 is pressed onto the PET film sheet s by a mounting head at a predetermined pressure. The mounting member 40 is thus adhered and fixed on the PET film sheet S at a predetermined position through the first through third adhesive layers 24, 25, and 26.

Although each of the mounting members 6, 30, 40 in the first, second, and third embodiments is adhered and fixed on the PET film sheet S through the first, second, and third adhesive layers 24, 25, and 26, those mounting members 6, 30, and 40 may be fixed on the PET film sheet S with use of various fixing manners besides the above-mentioned adhering manner with an adhesive.

In the key switch device 3 in the first, second, and third embodiments described above, each of the mounting members 6, 30, and 40 has the rotatably supporting portion 7 (or 31, 41) which rotatably supports the rotatable shaft 18 formed at the lower end of the first link 14 of the guide member 10 and the slidably supporting portion 8 (or 32, 42) which slidably supports the slidable shaft 20 formed at the lower end of the second link 15, and the mounting member is fixed on the PET film sheet S through the first, second, and third adhesive layers 24, 25, and 26. As shown in FIG. 3B, the key switch device 3 in a modification of the first embodiment is so configured that the mounting member 6 is adhered and fixed on the upper PET film sheet S1 of the membrane switch sheet MS through the first, second, and third adhesive layers 24, 25, and 26. Accordingly, there is no need for forming supporting portions in the support plate and an expensive pressing die is no longer needed, thus enabling the reduction of manufacturing cost of the keyboard 1. Since the need for producing such a die is eliminated, the manufacture can be started earlier.

Even if the specifications of the keyboard 1 provided with a plurality of the key switch devices 3 are different according to countries, it is sufficient to fix the mounting member 6 (30, 40) on the PET film sheet S through the adhesive layers 24, 25, and 26 in response to the specifications on a country-to-country basis. This can increase the design flexibility of the keyboard 1 having the key switch devices 3 without preparation of a pressing die for the different specifications on a country-to-country basis.

In the key switch device 3 in the first and second embodiments, the mounting member 6 (30) fixed on the PET film sheet S is formed in a chip having the unit length of one key switch device 3. As a result, the design flexibility of the keyboard 1 having a plurality of the key switch devices 3 can be further increased when the key switch devices 3 are manufactured so as to satisfy different specifications thereof on a country-to-country basis.

In the key switch device 3 in the third embodiment, the mounting member 40 is so designed as to have the length corresponding to a plurality of the key switch devices 3 disposed on the PET film sheet S so that the shafts 18 of the first links 14 and the shafts 20 of the second links 15 are rotatably or slidably supported. In correspondence to each row of the key switch devices 3, the mounting member 40 is fixed on the PET film sheet S through the adhesive layers 24, 25, and 26. Accordingly, the number of adhering steps for fixing the mounting members 40 to the PET film sheet can be decreased as compared with the first and second embodiments where the chipped mounting members 6, 30 are fixed individually to the PET film sheet. This can reduce the cost of the key switch device 3.

Figure 8A:
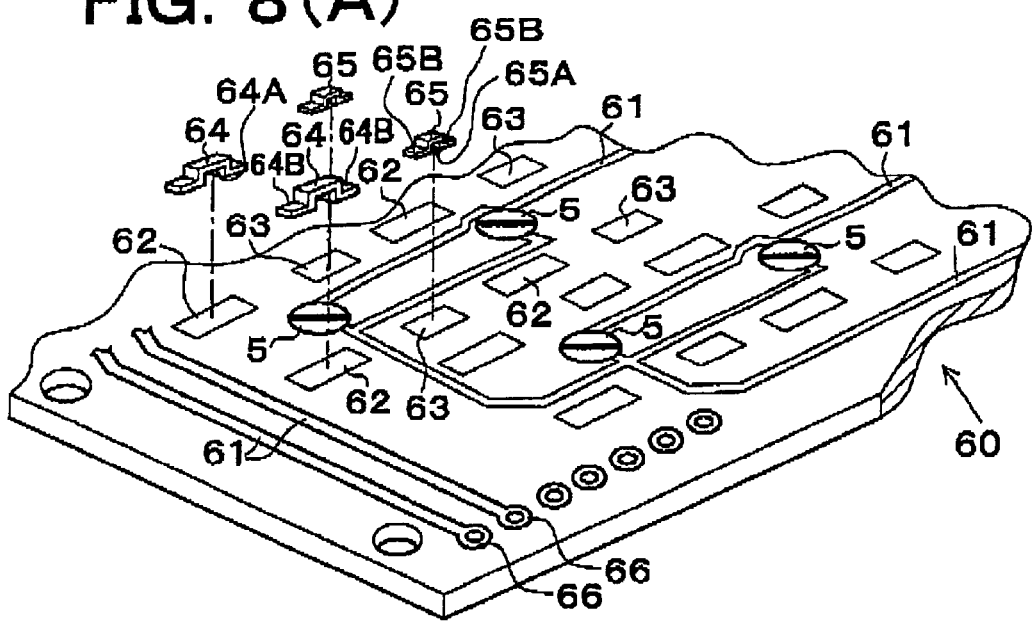
FIG. 8A is a schematic perspective view of the mounting members when fixed by soldering on a rigid circuit board in the key switch device in a fourth preferred embodiment according to the present invention.

The key switch devices in a fourth preferred embodiment will be described below with reference to FIG. 5A. The key switch device in this embodiment has substantially the same structure as in the first embodiment, except that the mounting member, in the fourth embodiment, made of metal is fixed by soldering on metal land patterns formed adjacent to a fixed contact pattern on a rigid circuit board, while the mounting member 6 in the first embodiment is fixed on the PET film sheet S with an adhesive. Accordingly, parts identical to those of the first embodiment are indicated at the same reference numerals. The following description is focused on the specific feature to the key switch device 3 in the fourth embodiment. FIG. 8A is a schematic perspective view of mounting members when fixed by soldering on a rigid circuit board in the key switch device in the fourth preferred embodiment.

In FIG. 8A, a rigid circuit board 60 may be a printed circuit to board formed of a paper base material and phenolic resin, or a glass base material and epoxy resin on the upper surface of the rigid circuit board 60, a plurality of key switch devices 3 are arranged. The circuit board 60 serves to support the keyboard 1 when constructed (see FIG. 1). On the upper surface of the circuit board 60, a predetermined copper foil circuit 61 is formed. A fixed contact pattern 5 is formed at a substantially center within the area associated with each key switch 3 in the copper foil circuit 61.

Copper foil land patterns 62 and 63 are formed at four positions surrounding the fixed contact pattern 5. The land pattern 62 is provided for fixing both fixing ends 64B of a metal slidably supporting member 64 so as to slidably support the slidable shaft 20 formed at the lower end of the second link 15 of the guide member 10. The land pattern 63 is provided for fixing both fixing ends 65B of a metal rotatably supporting member 65 so as to rotatably support the rotatable shaft 18 formed at the lower end of the first link 14.

The rigid circuit board 60 is formed in the following manner; copper foil is applied to an insulating material formed of a paper base material and phenolic resin, or a glass base material and epoxy resin, to obtain a copper clad laminated board. Etching resist is then applied to each section on the copper foil where the circuit pattern 61, the fixed contact pattern 5, and the cooper foil land patterns 62 and 63 are formed. Unnecessary copper portions where the etching resist is not applied, are removed by etching to form those patterns. The circuit pattern 61 including the fixed contact pattern 5 and the land patterns 62 and 63 are simultaneously formed. When the board 60 is constructed as a double-sided printed circuit board where the predetermined circuit patterns are formed on both sides of the board 60 and are connected via through holes 66, the back side of the board 60 may be used as a motherboard. In this case, various electronic components are mounted on the back side of the board 60.

In each of the land patterns 62 and 63 formed on the board 60 as described above, the copper foil exists below a slidably supporting portion 64A of the slidably supporting member 64 and a rotatably supporting portion 65A of the rotatably supporting member 65. During the vertical movement of the key top 9, the slidable shaft 20 formed at the lower end of the second link 15 slides on the copper foil below the supporting portion 64A and is supported in the supporting portion 64A. Similarly, the rotatable shaft 18 formed at the lower end of the first link 14 rotates on the copper foil below the supporting portion 65A and is supported in the supporting portion 65A. This construction reduces the resistances in the shafts 18 and 20 to rotate or slide, so that the operability of the key top 9 can be greatly improved.

To fix the supporting members 64 and 65 on the land patterns 62 and 63 formed on the circuit board 60 by soldering, the board 60 is set in a predetermined position with respect to an automatic soldering device. Then, solder paste is applied to the land patterns 62 and 63. Thereafter, with an automatic mounting device loading the supporting members 64 and 65, the fixing ends 64B, 65B of the supporting members 64 and 65 are placed on the solder paste layers formed on the land patterns 62 and 63. The reflow soldering process is then carried out. As a result, the supporting members 64 and 65 are soldered to the land patterns 62 and 63, respectively.

In the key switch device 3 in the fourth embodiment described above, the rigid circuit board 60 has the circuit pattern 61 including the fixed contact pattern 5, and the land patterns 62 and 63 surrounding the fixed contact pattern 5 formed thereon. The metal supporting members 64 and 65 are fixed by soldering on the land patterns 62 and 63 of the board 60, so as to slidably support the slidable shaft 20 formed at the lower end of the second link 15 or rotatably support the shaft 18 formed at the lower end of the first link 14 of the guide member 10. It is therefore unnecessary to form supporting portions in the support plate by a press working. Accordingly, the need of a pressing die used in the press working is eliminated, and the manufacture cost of the key switch device 3 can be reduced. The need of producing such a die is also eliminated, so that the manufacture can be started earlier.

Even if the specifications of the keyboard 1 provided with a plurality of the key switch devices 3 are different on a country-to-country basis, it is sufficient to form land patterns 62 and 63 in response to the specifications and to fix the metal supporting members 64 and 65 on the land patterns 62 and 63 by soldering This can increase the design flexibility of the keyboard 1 having the key switch devices 3 without preparation of a pressing die for the different specifications on a country-to-country basis.

The fixing ends 64B, 65B of the supporting members 64 and 65 are fixed by soldering on the land patterns 62 and 63 of the rigid circuit board 60. Accordingly, the support plate is not necessarily required, which enables the weight reduction of the key switch device 3. Even if the keyboard 1 is so configured that a plurality of the key switch devices 3 are supported an the board 60, the board 60, which has the great rigidity and shows little decrease in bending strength with the increase in the temperature of the thermosetting resin of the board 60, can support the entire keyboard 1, so that the support plate can be eliminated.

Figure 8B:
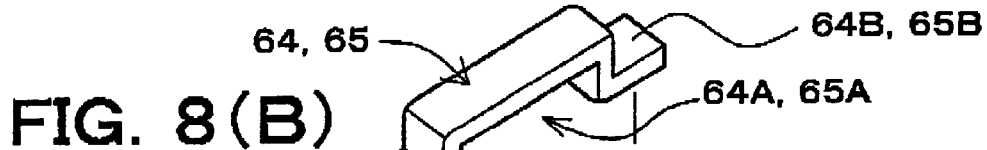
FIG. 8B is a schematic perspective view of the mounting member fixed on a modification of the rigid circuit board in the fourth embodiment.
Figure 8C:
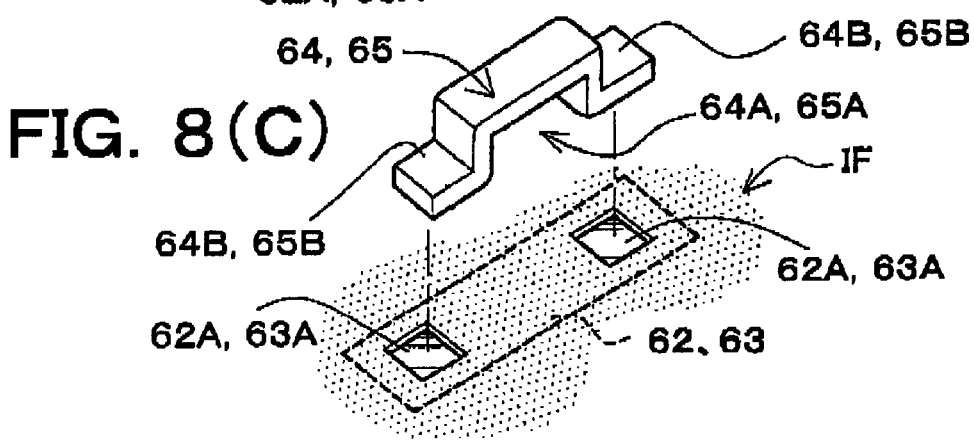
FIG. 8C is a schematic perspective view of the mounting member fixed on an another modification of the rigid circuit board in the fourth embodiment.

In the board 60 shown in FIG. 8A, the each of land patterns 62 and 63 is formed from one piece of copper foil so as to connect the soldering portions and a slidably or rotatably contacting portion. Alternatively, the land patterns 62 and 63 may be constructed as shown in FIG. 8B or FIG. 8C. In FIG. 8B, the land pattern 62, 63 is constructed of contact land 62B, 63B corresponding to a slidably supporting portion 64A of the slidably supporting member 64 or a rotatably supporting portion 65A of the rotatably supporting member 65, and connecting lands 62A, 63A formed at both ends of the contact land 62B, 63B. The fixing ends 64B, 65B of the supporting members 64 and 65 formed at each end thereof are fixed on the lands 62A and 63A, respectively with use of various fixing manners including the adhering manner with an adhesive and soldering manner. The slidable shaft 20 of the second link 15 and the rotatable shaft 18 of the first link 14 slidably or rotatably contacts the lands 62B and 63B, respectively.

In FIG. 8C, the land patterns 62 and 63 are first formed on the rigid circuit board 60. Then, an insulating resist film IF is applied to the land patterns 62 and 63 so as to expose the lands 62A and 63A. The fixing ends 64B, 65B of the supporting members 64 and 65 formed at each end thereof are fixed on the lands 62A and 63A, respectively with use of various fixing manners including the adhering manner with an adhesive and soldering manner. The slidably supporting portion 64A of the slidably supporting member 64 and the rotatably supporting portion 65A of the rotatably supporting member 65 correspond to the insulating resist film IF. The slidable shaft 20 of the second link 15 and the rotatable shaft 18 of the first link 14 slidably or rotatably contact the insulating resist film IF.

Figure 9:
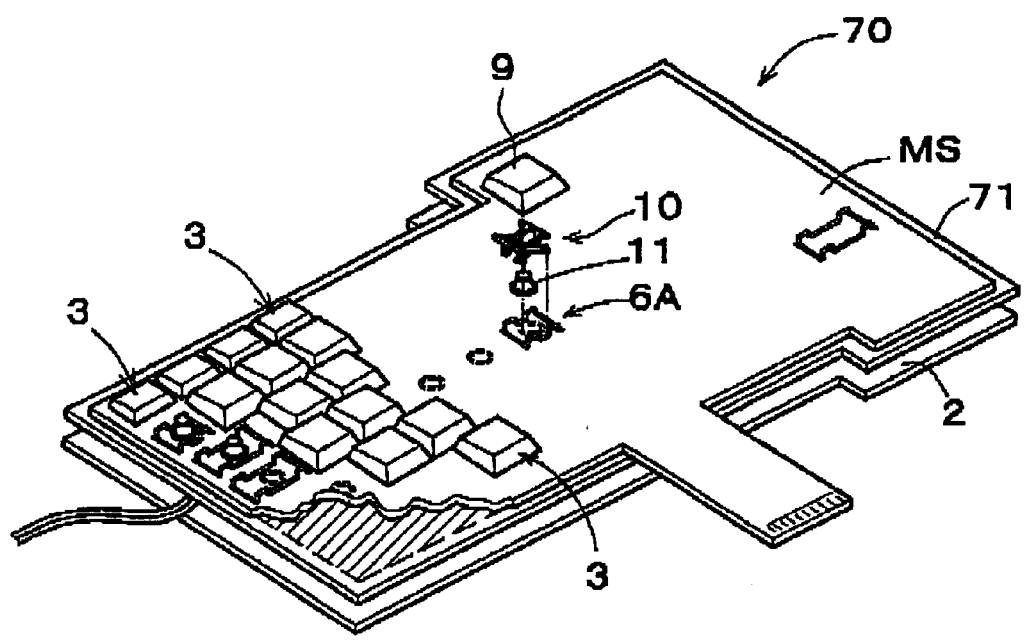
FIG. 9 is a perspective view of a keyboard provided with key switch devices in a fifth preferred embodiment according to the present invention.
Figure 10:
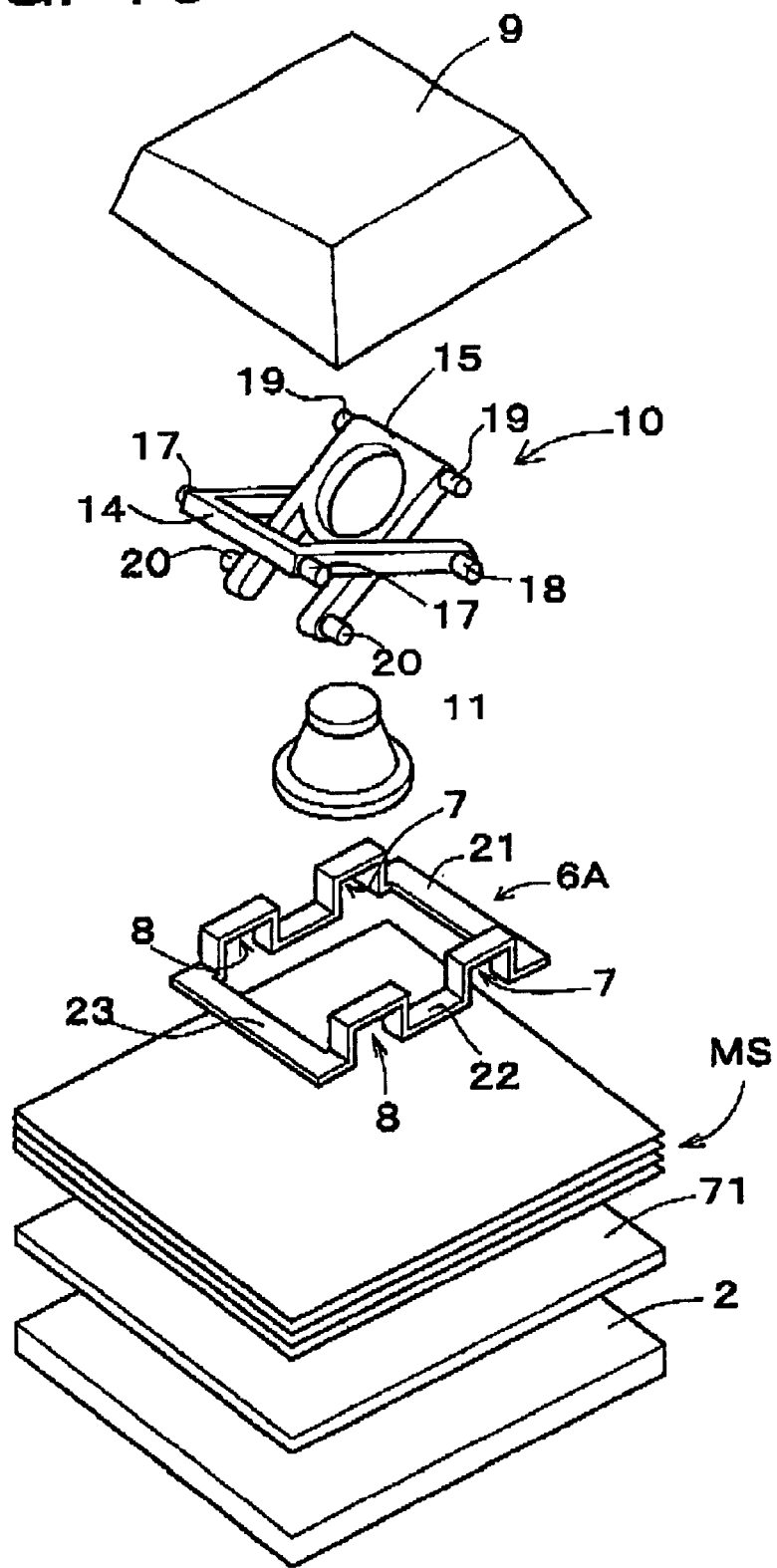
FIG. 10 is an exploded perspective view of the key switch device in the fifth embodiment.

Next, a key switch device in a fifth embodiment will be described with reference to FIGS. 9 and 10. FIG. 9 is a perspective view of a keyboard provided with the key switch devices in the fifth embodiment. FIG. 10 is an exploded perspective view of a key switch device in the fifth embodiment. The key switch device in this embodiment has substantially the same structure as in the modification of the first embodiment (shown in FIG. 3B), except that an electroluminescent sheet (hereinafter referred to as "EL sheet") is disposed between the support plate 2 and the membrane switch sheet MS having a pair of an upper transparent sheet and a lower transparent sheet, in this embodiment, while the EL sheet is not used in the modification of the first embodiment but the membrane switch sheet MS is disposed on the support plate 2. Accordingly, parts identical to those of the modification of the first embodiment are indicated at the same reference numerals, and the detail description of those parts is referred thereto and omitted. The following description is focused on the feature of the key switch device in the fifth embodiment.

The structure of a keyboard having key switch devices in the fifth embodiment will be described below with reference to FIG. 9. A keyboard 70 is mainly constructed of a membrane switch sheet MS on which key switch devices 3 are disposed, an EL sheet 71 disposed under the membrane switch sheet MS, and a support plate 2 that supports the membrane switch sheet MS and the EL sheet 71.

The key top 9, the guide member 10, the rubber spring 11, the membrane switch sheet MS, and the support plate 2 in the key switch device 3 described above, are substantially the same as those shown in FIG. 3B. The mounting member 6A is substantially the same as that shown in FIG. 43. The structures of those parts are referred to FIGS. 3B and 4B.

The EL sheet 71 has a layered structure with a dielectric layer and a light emitting phosphor layer typically made of powders, sandwiched between a back electrode and a front transparent electrode. As voltage is applied to the electrodes, the phosphors will emit light through the transparent front electrode. The features of the EL sheet are: (1) a surface-source light with uniform light emission; (2) a cool light emission without heat generation; (3) shaped into a very thin form; (4) lightweight; (5) various colors of light emission realized with the selection of the phosphor, and so on.

The key switch device 3 in the fifth embodiment including the EL sheet 71 disposed under the membrane switch sheet, has effects such that key operation can be easily performed. Such effects will be described in detail below.

(1) In a conventional keyboard mounted on a notebook-size personal computer, a LED is lighted in association with specific key switch devices. When the keyboard is used in darkness or low ambient light conditions, it is difficult to determine specific key tops during key operation. In the keyboard 70 in the fifth embodiment, a predetermined voltage is applied to the EL sheet 71 as the computer is turned on. The EL sheet backlights the entire keyboard 70. Therefore, all the key switch 3 on the keyboard 70 can be easily identified, even in darkness or low ambient light conditions, so that key operation can be easily performed in such conditions. (2) When a projector, which is usually used in darkness or low ambient light conditions, is operated by a personal computer connected thereto, the computer provided with the keyboard 70 in the fifth embodiment, will ensure the proper and smooth projector operations with the EL sheet 71 backlighting the entire keyboard 70.

In the key switch device in the fifth embodiment described above, the same effects will be obtained when the EL sheet 71 is placed on the membrane switch sheet MS.

It is to be noted that the invention is not limited to the above preferred embodiments but various modifications and changes may be made without departing from the scope of the invention.

For example, although the mounting member 6 (30, 40) of the key switch device 3 in the first to third embodiments is made of linear metal and, instead thereof, may be made of linear resin In case of the use of linear resin, as the adhesive to adhere the mounting member 6 (30, 40) on the PET film sheet S, an adhesive suitable for both of the PET film sheet 5 and the resin forming the mounting member 6 (30, 40) is preferably selected.

Figure 11:
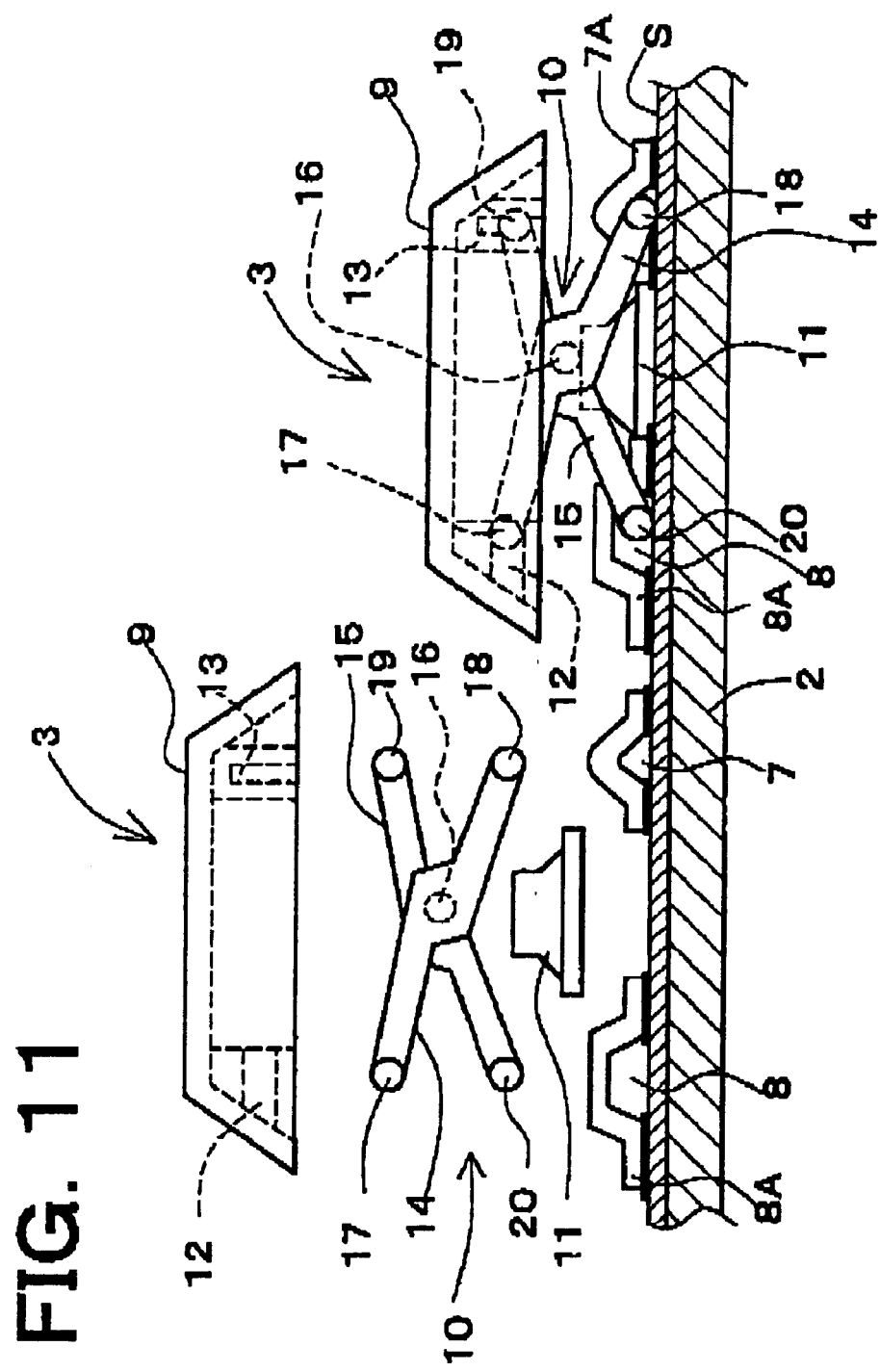
FIG. 11 is a schematic side view of a modification of the key switch devices in the first embodiment, one of which is shown in an exploded state.

Although the mounting member 6 of the key switch device 3 in the first embodiment is formed in a chip having the unit length of one key switch device 3, the mounting member 6 may alternatively be formed of two separate supporting portions 7A and 8A as shown in FIG. 11. When the mounting member 6 is constructed of the separately formed supporting portions 7A and 8A, the forming pattern of the adhesive layers applied onto the PET film sheet S are required changing in correspondence to the separate portions 7A and BA.

Figure 12:
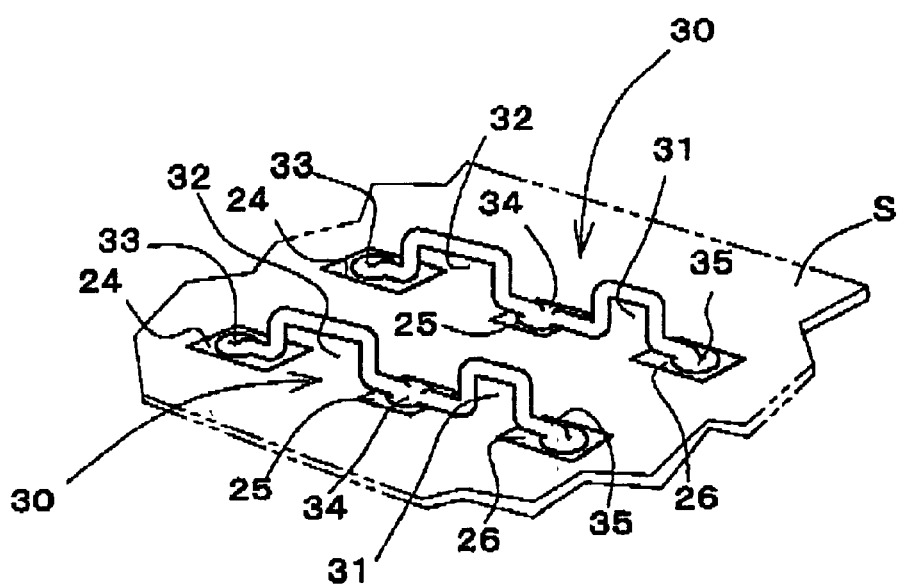
FIG. 12 is a schematic perspective view of a modification of the mounting members fixed on the PET film sheet in the key switch device in the second embodiment.

Although the mounting member 30 of the key switch device 3 in the second embodiment is made of a needle-like material, the first, second, and third adhering portions 33, 34, and 35 which are associated with the adhesive layers 24, 25, and 26 respectively may be shaped like a flat plate, as shown in FIG. 12. In this case, the adhering area of the adhering portions 33, 34, and 35 to the adhesive layers 24, 25, and 26 are extended, so that the mounting member 30 can firmly and securely fixed on the PET film sheet S.

Although the mounting member 6 of the key switch device 3 in the first embodiment is provided with the first, second, and third adhering portions 21, 22, and 23 and the supporting portions 7 and 8 which are formed between the adhering portions, the mounting member 6 may be alternatively modified as below.

Figure 13:
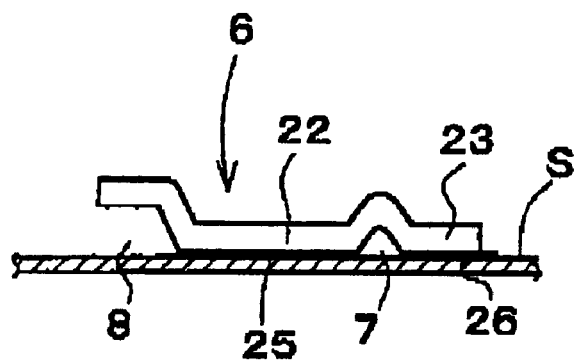
FIG. 13 is a schematic side view of a first modification of the mounting member in the first embodiment.

A first modification of the mounting member 6 may have a supporting portion 8 opening at one side (the left side in FIG. 13) and no first adhering portion 21.

Figure 14:
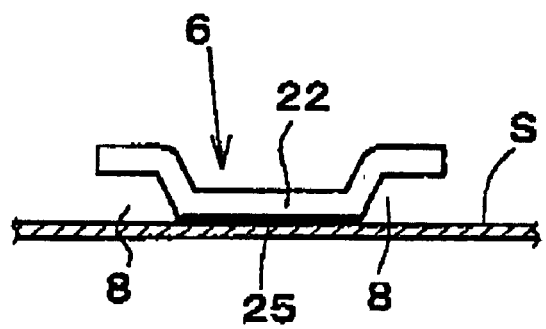
FIG. 14 is a schematic side view of a second modification of the mounting member in the first embodiment.

A second modification of the mounting member 6 may have the supporting portions 8 opening at opposite sides and no first and third adhering portions 21 and 23, as shown in FIG. 14. It is to be noted that the forming pattern of the adhesive layers are needed changing according to those modifications. In this case, like the shaft 20 of the second link 15, the shaft 18 of the first link 14 is also slid in the supporting portion 8.

Figure 15:
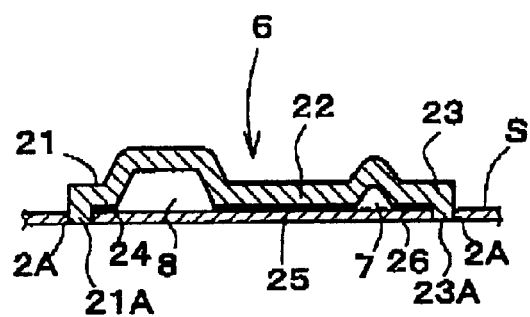
FIG. 15 is a schematic side view of a third modification of the mounting member in the first embodiment.

A third modification of the mounting member 6 may have the first and third adhering portions 21 and 23 provided with end portions 21A and 23A which are bent downward as shown in FIG. 15 and function of positioning the mounting member 6 in place. When these end portions 21A and 23A are inserted in holes 2A formed in the PET film sheet S, the mounting member 6 can be placed in a predetermined position on the PET film sheet S.

Figure 16:
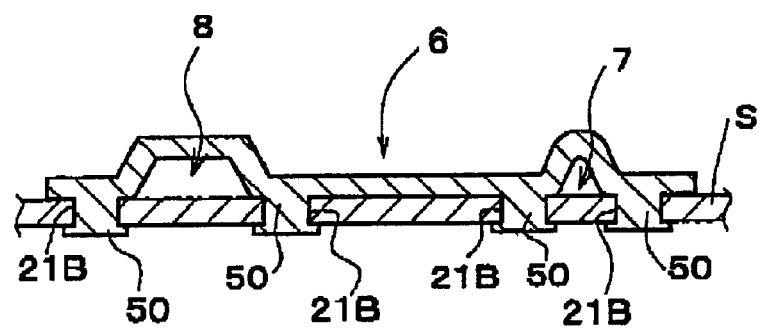
FIG. 16 is a schematic side view of a fourth modification of the mounting member in the first embodiment.

In a fourth modification of the key switch device 3 in the first embodiment, as shown in FIG. 16, the mounting member 6 may integrally have projections 50 formed at both lower ends of the slidably supporting portion 8 and both lower ends of the rotatably supporting portion 7, respectively. These protections 50 penetrate through fixing holes 21B of the PET film sheet S, and the sheet S is subjected to annealing at about 150° C. This PET film sheet S is shrunk by the annealing. As a result, the projections 50 are firmly secured in the holes 21B, thereby fixing the mounting member 6 on the PET film sheet S. In this modification, the use of an adhesive can be eliminated.

Figure 17:
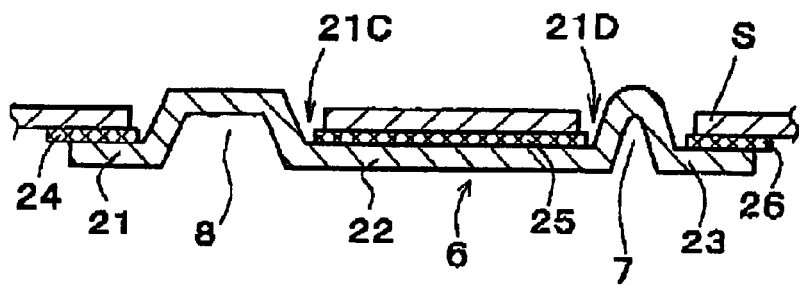
FIG. 17 is a schematic side view of a fifth modification of the mounting member in the first embodiment.

Furthermore, in a modification of the PET film sheet of the key switch device 3 in the first embodiment, as shown in FIG. 17, the PET film sheet S is provided with through holes 21C and 21D and a first, second, and third adhering layers 24, 25, and 26 on the underside of the sheet S. The mounting member 6 is disposed under the PET film sheet S such that the supporting portions 7 and 8 are upwardly inserted in the through holes 21D and 21C respectively, and the first, second, and third adhering portions 21, 22, and 23 are adhered to the first, second, and third adhesive layers 24, 25, and 26 respectively. As a result, the mounting member 6 is adhered and fixed on the underside of the PET film sheet S. Since the supporting portions 7 and 8 are inserted in the through holes 21D and 21C, the mounting member 6 will not easily be separated from the PET film sheet S.

Figure 18:
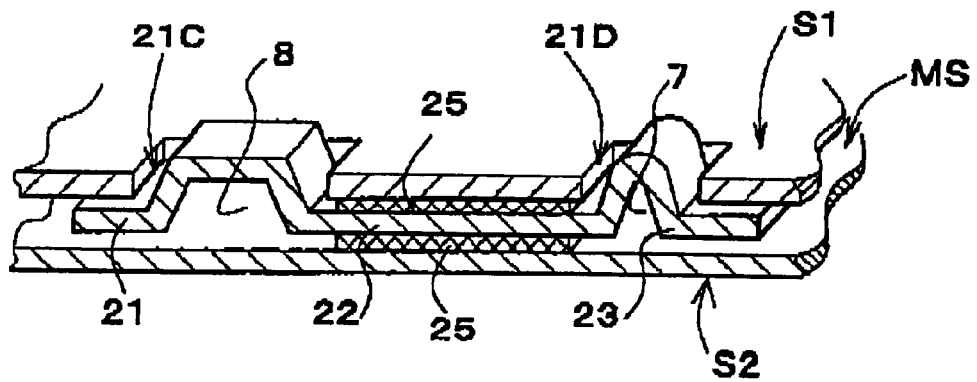
FIG. 18 is a schematic side view of a sixth modification of the mounting member in the first embodiment.

In a modification of the PET film sheet of the key switch device 3 shown in FIG. 3B, as shown in FIG. 18, the upper PET film sheet S1 of the membrane switch sheet MS is provided with through holes 21C and 21D and applied with a second adhesive layers 25 on the underside of the sheet S1 and on the upper surface of the sheet S2 opposite to the adhesive layer 25 on the underside of the sheet S1. The mounting member 6 is disposed under the upper PET film sheet S1 such that the supporting portions 7 and 8 of the mounting member 6 are upwardly inserted in the through holes 21D and 21C respectively.

The lower PET film sheet S2 is made contact under pressure with the upper PET film sheet S1. As a result, the second adhering portion 22 of the mounting member 6 is adhered and fixed between the upper and lower PET film sheets S1 and S2 through the second adhesive layers 25. Thus, the mounting member 6 is sandwiched between the upper and lower PET film sheets S1 and S2 with the supporting portions 7 and 8 inserted in the through holes 21D and 21C respectively, so that the mounting member 6 will not be easily separated from the PET film sheet S. In addition, the first, second, and third adhering portions 21, 22, and 23 having a predetermined thickness can function as a spacer sheet S3. The use of the spacer sheet S3 can be eliminated accordingly.

Figure 19:
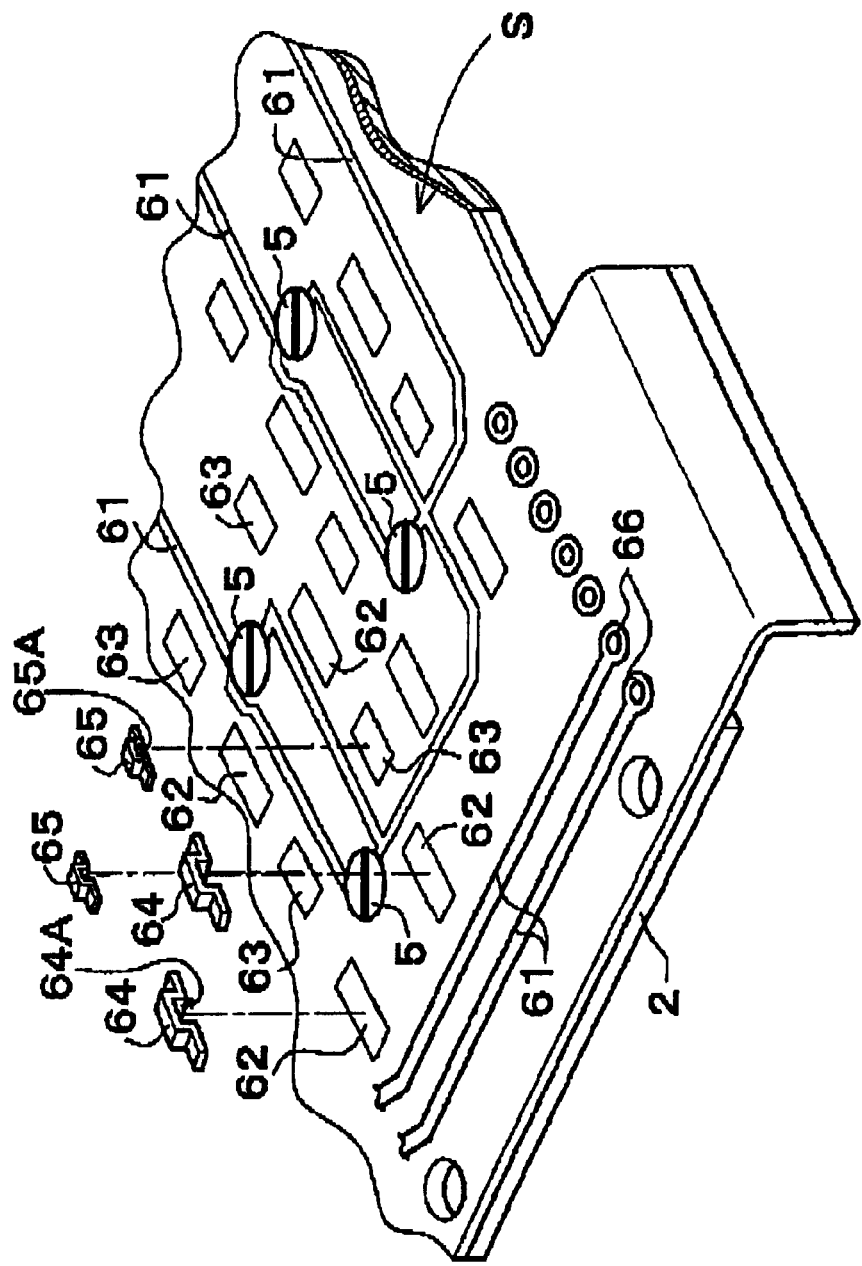
FIG. 19 is a schematic perspective view of a modification of the key switch device in the fourth embodiment when the mounting members are fixed on the PET film sheet, instead of rigid circuit board.

Furthermore, in the key switch device 3 in the fourth embodiment, as shown in FIG. 8A, the rigid circuit board 60 has the fixed contact is pattern 5, the circuit pattern 61, and the copper foil land patterns 62 and 63 which are simultaneously formed on the copper clad laminated board. On the land patterns 62 and 63, the slidably supporting member 64 and the rotatably supporting member 65 are fixed by soldering. Alternatively, the key switch device 3 in the fourth embodiment may be constructed as shown in FIG. 19. In FIG. 19, a laminated material constructed of a PET film sheet S laminated with copper foil is used. Similar to the rigid circuit board 60, etching resist is applied to each section on the copper foil of the PET film sheet S where the circuit pattern 61, the fixed contact pattern 5, and the cooper foil land patterns 62 and 63 are formed unnecessary copper portions where the etching resist is not applied, are removed by etching to form those patterns. The thus formed PET film sheet s may alternatively be used. The slidably supporting member 64 and the rotatably supporting member 65 are fixed on the land patterns 62 and 63 formed on the sheet S respectively by the same fixing manner of soldering as in the fourth embodiment. In this modification, the support plate 2 is required to support the PET film sheet S at the underside thereof, similar to the first to the third embodiments.

What is claimed is:

1. A key switch device, including:
   a key top;
   a circuit board disposed below the key top, the circuit board having a switching circuit formed thereon;
   a guide member provided with a first link and a second link;
   a switching member which performs a switching operation with the switching circuit on the circuit board in association with a movement of the key top;
   a first shaft formed at a lower end of the first link;
   a second shaft formed at a lower end of the second link;
   a support plate supporting the circuit board thereon; and
   a mounting member for movably supporting both the first and second shafts, the mounting member having a chipped configuration constituted from a linear material with at least one folded portion and being independently formed from the support plate, the chipped mounting member being disposed on an upper surface of the circuit board and being smaller in area than the circuit board, wherein the first or second shaft is supported in a space formed between a folded portion of the at least one folded portion of the mounting member and the circuit board.

2. The key switch device according to claim 1, further comprising a fixing area formed on the circuit board, for fixing the mounting member on the circuit board.

3. The key switch device according to claim 2, wherein the fixing area is a metal land pattern formed when the switching circuit is formed on the circuit board.

4. The key switch device according to claim 3, wherein the mounting member is made of metal, the mounting member being fixed to the metal land pattern by soldering.

5. The key switch device according to claim 3, wherein the mounting member includes at least a first mounting member and a second mounting member, and the metal land pattern includes at least a first land pattern to fix the first mounting member and a second land pattern to fix the second mounting member.

6. The key switch device according to claim 5, wherein the first mounting member slidably supports the second shaft of the second link and the second mounting member rotatably supports the first shaft of the first link.

7. The key switch device according to claim 6, wherein the first mounting member has a slidably supporting portion to slidably support the second shaft of the second link between both fixing ends formed at both sides of the first mounting member, each fixing end being fixed on the first land pattern and the second mounting member has a rotatably supporting portion to rotatably support the first shaft of the first link between both fixing ends formed at both sides of the second mounting member, each fixing end being fixed on the second land pattern.

8. The key switch device according to claim 7, wherein the first land pattern has a slidably supporting area corresponding to the supporting portion of the first mounting member and the second land pattern has a rotatably supporting area corresponding to the supporting portion of the second mounting member.

9. The key switch device according to claim 8, wherein the second shaft of the second link is slid while contacting with the supporting area of the first land pattern and the first shaft of the first link is rotated while contacting with the supporting area of the second land pattern.

10. The key switch device according to claim 8, wherein the supporting area of the first land pattern separates from fixing areas where both the fixing ends of the first mounting member are fixed and the supporting area of the second land pattern separates from fixing areas where both the fixing ends of the second mounting member are fixed.

11. The key switch device according to claim 8, further comprising an insulating resist film applied on the first and second land pattern;
   fixing areas formed both sides of the first land pattern by applying the insulating resist film to the first land pattern so as to expose both sides of the first land pattern, both fixing ends of the first mounting member being fixed on the fixing areas; and
   fixing areas formed both sides of the second land pattern by applying the insulating resist film to the second land pattern so as to expose both sides of the second land pattern, both fixing ends of the second mounting member being fixed on the fixing areas.

12. The key switch device according to claim 11, wherein both the supporting areas of the first and second land pattern are covered by the insulating resist film.

13. The key switch device according to claim 12, wherein the second shaft of the second link is slid while contacting with the insulating resist film corresponding to the supporting area of the first land pattern and the first shaft of the first link is rotated while contacting with the insulating resist film corresponding to the supporting area of the second land pattern.

14. The key switch device according to claim 3, wherein the circuit board is constructed from a rigid circuit board.

15. The key switch device according to claim 3, wherein the circuit board is constructed from a film circuit board.

16. A key switch device, including:
   a key top;
   a transparent membrane switch member disposed below the key top;
   a guide member provided with a first link and a second link;
   a switching member which performs a switching operation of the membrane switch member in association with a movement of the key top;
   a first shaft formed at a lower end of the first link;
   a second shaft formed at a lower end of the second link;
   a support plate supporting the circuit board thereon;
   a mounting member for movably supporting both the first and second shafts, the mounting member having a chipped configuration constituted from a linear material with at least one folded portion and being independently formed from the support plate, the chipped mounting member being disposed on an upper surface of the membrane switch member and being smaller in area than the membrane switch member; and
   an electro-luminescent sheet disposed below the membrane switch member, the electro-luminescent sheet backlighting the key top when a predetermined voltage is applied to the electro-luminescent sheet, wherein the first or second shaft is supported in a space formed between a folded portion of the at least one folded portion of the mounting member and the circuit board.

17. The key switch device according to claim 16, wherein the membrane switch member includes a transparent membrane switch sheet having a pair of an upper transparent sheet and a lower transparent sheet, and the switching member performs a switching operation with the membrane switch sheet in association with a vertical movement of the key top.

18. The key switch device according to claim 17, wherein the mounting member is fixed on an upper surface of the upper transparent film sheet of the membrane switch sheet.

19. A keyboard provided with a key switch device, including:

a key top;

a circuit board disposed below the key top, the circuit board having a switching circuit formed thereon;

a guide member provided with a first link and a second link;

a switching member which performs a switching operation with the switching circuit on the circuit board in association with a movement of the key top;

a first shaft formed at a lower end of the first link;

a second shaft formed at a lower end of the second link;

a support plate supporting the circuit board thereon; and a mounting member for movably supporting both the first and second shafts, the mounting member having a chipped configuration constituted from a linear material with at least one folded portion and being independently formed from the support plate, the chipped mounting member being disposed on an upper surface of the circuit board and being smaller in area than the circuit board, wherein the first or second shaft is supported in a space formed between a folded portion of the at least one folded portion of the mounting member and the circuit board.

20. An electronic apparatus having a keyboard provided with a key switch device, including:

a key top;

a circuit board disposed below the key top, the circuit board having a switching circuit formed thereon;

a guide member provided with a first link and a second link;

a switching member which performs a switching operation with the switching circuit on the circuit board in association with a movement of the key top;

a first shaft formed at a lower end of the first link;

a second shaft formed at a lower end of the second link;

a support plate supporting the circuit board thereon; and a mounting member for movably supporting both the first and second shafts, the mounting member having a chipped configuration constituted from a linear material with at least one folded portion and being independently formed from the support plate, the chipped mounting member being disposed on an upper surface of the circuit board and being smaller in area than the circuit board, wherein the first or second shaft is supported in a space formed between a folded portion of the at least one folded portion of the mounting member and the circuit board.

* * * * *